United States Patent
Sakai

(10) Patent No.: US 9,425,990 B2
(45) Date of Patent: Aug. 23, 2016

(54) INFORMATION PROCESSING DEVICE FOR GENERATING A MESSAGE INPUT AREA AND PROCESSING A RECEIVED MESSAGE

(75) Inventor: Masaharu Sakai, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 254 days.

(21) Appl. No.: 13/257,341

(22) PCT Filed: Apr. 7, 2011

(86) PCT No.: PCT/JP2011/002081
§ 371 (c)(1),
(2), (4) Date: Dec. 1, 2011

(87) PCT Pub. No.: WO2011/151965
PCT Pub. Date: Dec. 8, 2011

(65) Prior Publication Data
US 2013/0144956 A1    Jun. 6, 2013

(30) Foreign Application Priority Data

Jun. 3, 2010   (JP) ................... 2010-128198
Jun. 3, 2010   (JP) ................... 2010-128199

(51) Int. Cl.
*G06F 15/16*   (2006.01)
*H04L 12/58*   (2006.01)
*A63F 13/833*   (2014.01)
(Continued)

(52) U.S. Cl.
CPC .............. *H04L 12/581* (2013.01); *A63F 13/45* (2014.09); *A63F 13/833* (2014.09); *A63F 13/87* (2014.09); *H04L 51/046* (2013.01); *H04L 51/12* (2013.01); *H04L 51/18* (2013.01)

(58) Field of Classification Search
CPC .................. A63F 13/45; A63F 13/87
See application file for complete search history.

(56) References Cited

U.S. PATENT DOCUMENTS

| | | | | |
|---|---|---|---|---|
| 5,377,997 A | * | 1/1995 | Wilden | A63F 13/10 434/323 |
| 6,244,960 B1 | * | 6/2001 | Takasaka | G06F 3/033 446/141 |

(Continued)

FOREIGN PATENT DOCUMENTS

| CN | 1719823 A | 1/2006 |
|---|---|---|
| CN | 101079835 A | 11/2007 |

(Continued)

OTHER PUBLICATIONS

Office Action for corresponding Japanese Patent Application No. 2010-128198, dated Apr. 1, 2014.

(Continued)

*Primary Examiner* — Moustafa M Meky
(74) *Attorney, Agent, or Firm* — Matthew B. Dernier, Esq.

(57) ABSTRACT

A message data acquisition unit acquires message data including a message and additional information. An event ID acquisition unit acquires, when a condition fulfillment detection unit determines that a condition is fulfilled, condition identification information identifying the fulfilled playing condition in the game. A display information generation unit displays a message in the message data including the additional information corresponding to the acquired condition identification information, in a game screen displayed on a display device.

4 Claims, 21 Drawing Sheets

(51) Int. Cl.
  *A63F 13/87* (2014.01)
  *A63F 13/45* (2014.01)

(56) References Cited

U.S. PATENT DOCUMENTS

| | | | |
|---|---|---|---|
| 6,563,999 | B1 | 5/2003 | Suzuoki |
| 6,612,931 | B2 * | 9/2003 | Kojima ................ A63F 13/12 463/19 |
| 7,115,035 | B2 * | 10/2006 | Tanaka ................ A63F 13/00 463/40 |
| 7,861,175 | B2 * | 12/2010 | Wormald ............. A63F 13/12 463/40 |
| 8,301,708 | B2 | 10/2012 | Asami |
| 2002/0025853 | A1 * | 2/2002 | Kojima et al. ................ 463/42 |
| 2003/0134678 | A1 * | 7/2003 | Tanaka ................ A63F 13/00 463/42 |
| 2005/0209008 | A1 * | 9/2005 | Shimizu ............... A63F 13/10 463/43 |
| 2008/0132336 | A1 * | 6/2008 | Kobayashi ........... A63F 13/12 463/42 |
| 2009/0209335 | A1 | 8/2009 | Pearce |
| 2010/0184516 | A1 * | 7/2010 | Matsumura .......... A63F 13/12 463/42 |
| 2010/0217798 | A1 | 8/2010 | Asami |
| 2013/0007641 | A1 * | 1/2013 | Wormald ............. A63F 13/12 715/758 |

FOREIGN PATENT DOCUMENTS

| | | |
|---|---|---|
| CN | 101547163 A | 9/2009 |
| EP | 1111883 A2 | 6/2001 |
| EP | 1758409 A1 | 2/2007 |
| EP | 1813329 A1 | 8/2007 |
| JP | 2000078308 A | 3/2000 |
| JP | 2001137536 A | 5/2001 |
| JP | 2002169737 A | 6/2002 |
| JP | 2003141017 A | 5/2003 |
| JP | 2005182154 A | 7/2005 |
| JP | 2008250608 A | 10/2008 |
| JP | 2009055988 A | 3/2009 |
| JP | 2009193217 A | 8/2009 |
| JP | 2010046159 A | 3/2010 |
| JP | 2010082335 A | 4/2010 |
| JP | 2010088695 A | 4/2010 |
| JP | 2010517186 A | 5/2010 |

OTHER PUBLICATIONS

Office Action for corresponding JP Patent Application No. 2010-128198, dated Mar. 5, 2013.
International Search Report and Written Opinion for corresponding PCT application PCT/JP2011/002081, dated May 17, 2011.
Office Action for corresponding JP Patent Application No. 2010-128198, dated Nov. 26, 2013.
European Search Report for corresponding European Patent Application No. 11789380.0, dated May 8, 2014.
International Preliminary Report on Patentability and Written Opinion for corresponding PCT Application PCT/JP2011/002081, dated Jan. 8, 2013.
Office Action for corresponding Chinese Patent Application No. 201180002371.8, dated Jan. 15, 2014.
Office Action for corresponding Chinese Patent Application No. 201180002371.8, dated Aug. 8, 2014.

* cited by examiner

FIG.6

| EVENT ID | CONTENT OF PLAYING CONDITION |
|---|---|
| 00000001 | LEAVE THE FIRST TOWN |
| 00000010 | MEET A MERCHANT |
| ⋮ | ⋮ |
| 00001000 | DUNGEON OF A VOLCANO |
| ⋮ | ⋮ |
| 00111111 | START A FIGHT WITH A FINAL BOSS |
| 01000000 | BEAT THE FINAL BOSS |
| 01000001 | BEATEN BY THE FINAL BOSS |
| ⋮ | ⋮ |

| CONDITION ID | CONDITION TYPE |
|---|---|
| 00000001 | TIME CONDITION |
| 00000010 | LOCATION CONDITION |
| 00000011 | EVENT CONDITION |

- EVERY X-TH DAY OF THE WEEK

- EVERY DAY

- CURRENT LOCATION

- REGISTERED LOCATION A

- REGISTERED LOCATION B

- ▭

INFORMATION PROCESSING DEVICE FOR GENERATING A MESSAGE INPUT AREA AND PROCESSING A RECEIVED MESSAGE

TECHNICAL FIELD

The present invention relates to a technology of providing a message to a user.

BACKGROUND ART

Electronic mail systems are known as typical systems for transmitting and receiving messages between user terminals. In an electronic mail system, a Simple Mail Transfer Protocol (SMTP) server transfers electronic mail transmitted from a user to a Post Office Protocol (POP) server. The POP server stores transferred electronic mail. Users attempting to receive electronic mail retrieve the electronic mail by accessing the POP server. A chat system is known as a system to transmit and receive messages between user terminals in real time. In a chat system, messages entered by participants are displayed in real time when a user terminal connects to a chat server. User terminals can also transmit messages to participants.
[patent document No. 1] U.S. Pat. No. 6,563,999

In an electronic mail system, messages are retrieved when the user accesses a POP server. As such, an electronic mail system is inferior to a chat system in terms of responsiveness in information transmission. While a chat system is an excellent tool in terms of responsiveness in information transmission, users cannot be provided with messages without on-line connection to a chat server via, for example, the Internet. This calls for development of a system capable of receiving messages matching the situation in a responsive manner without on-line connection.

SUMMARY OF THE INVENTION

In this background, a general purpose of the present invention is to provide a technology of communicating messages to a user effectively.

In order to address the above problem, one embodiment of the present invention relates to an information processing device. The information processing device comprises: a message data acquisition unit configured to acquire message data including a message and additional information; a storage device configured to store acquired message data; a condition identification information acquisition unit configured to acquire, when a condition predefined in an application is fulfilled, condition identification information identifying the fulfilled condition; and a communicating unit configured to communicate the message in the message data, including the additional information corresponding to the acquired condition identification information.

Another embodiment of the present invention also relates to an information processing device. The information processing device comprises: an input area generation unit configured to generate an input area to enter a message on a screen when a condition predefined in an application is fulfilled; an acknowledging unit configured to acknowledge a message entered by a user in the input area; and a transmission data generation unit configured to generate transmission data including an acknowledged message and additional information identifying the fulfilled condition of the application.

Still another embodiment of the present invention also relates to an information processing device. The information processing device comprises: a message data acquisition unit configured to acquire message data including a message and a condition to communicate the message; a storage device configured to store the acquired message data; a status information acquisition unit configured to acquire status information of the information processing device; a communication determination unit configured to determine whether the acquired status information meets the condition to communicate the message data stored in the storage device; and a communication unit configured to communicate the message when the communication determination unit determines that the status information meets the condition to communicate the message.

Optional combinations of the aforementioned constituting elements, and implementations of the invention in the form of methods, apparatuses, systems, recording media, and computer programs may also be practiced as additional modes of the present invention.

The present invention provides a technology of communicating a message to a user effectively.

BRIEF DESCRIPTION OF THE DRAWINGS

FIG. 6 shows an exemplary event table that maps event ID's to playing conditions;
FIG. 20A shows an example of a time condition configuration screen;
and FIG. 20b shows an example of a location configuration screen.

DETAILED DESCRIPTION OF THE INVENTION

First Embodiment

A summary of the first embodiment will be given. When a user (user A) fulfills a condition predefined by the game software (hereinafter, sometimes referred to as "playing condition" or "game playing condition") while the user is playing a game with a game system according to the first embodiment, a message stored in a storage device such as a hard disk drive (HDD) or a flash memory and associated with the playing condition cleared is displayed on a game screen by the system software. The playing condition is defined as appropriate by the game software. For example, the playing condition may be that the user wins a special race in a racing game or that the user beats a specified enemy character in a fighting game. A result undesired for the user may be defined as a playing condition. For example, the playing condition may be that the user is beaten by a specified enemy character.

The message stored in the storage device is generated when another user (user B) fulfilled the playing condition of the same game before user A plays the game. For example, user B generates a comment on the fulfillment of the playing condition or a message of support. The game device of user B transmits data that maps the message to additional information specifying the cleared playing condition, to the game device of the user A when user B finishes playing the game. In this way, messages generated by user B are stored in the storage device of user A. The storage device of user A may store one or more messages generated by still another user. By communicating a message of user B generated when the same playing condition is fulfilled to user A while user A is playing the game, user A is provided with a message that matches the situation in which user A is playing. This provides an environment where user A can feel as if user A is playing the game with user B even if the game device of user A is off-line and so can realize instant message delivery.

Message data generated by a game manufacturer may be provided to user A. The message may be used as an explanatory note of tutorial or guidance.

Figure 1:
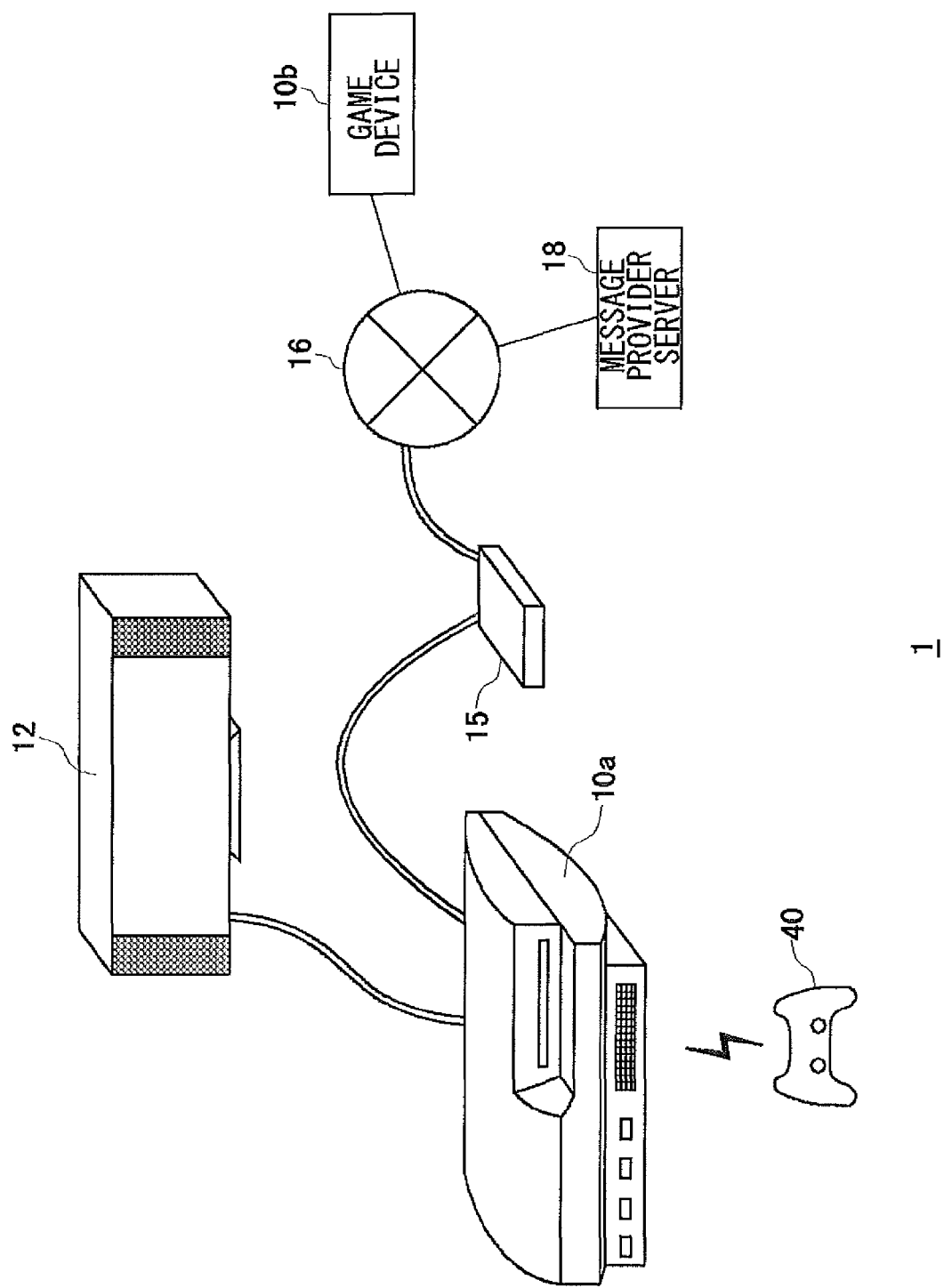
FIG. 1 shows a game system according to the first embodiment of the present invention.

FIG. 1 shows a game system according to the first embodiment of the present invention. The game system 1 is provided with a game controller 40, a game device 10a adapted to run a game program, and a display device 12 adapted to output an image showing a result of processing by the game device 10a. The game controller 40 is an input interface device that allows a user to enter an input to control the game device 10a. The game controller 40 may be configured to transmit a control input wirelessly or may be connected to the game device 10a by cable. The display device 12 may be a television having a speaker. The display device 12 may be connected to the game device 10a by cable or may be connected wirelessly using, for example, wireless local area network (LAN). The game device 10 is communicatively connected via a router 15 to a message provider server 18 connected to a network 16 and can transmit and receive desired data.

The message provider server 18 provides a message generated in another game device 10b to the game device 10a. Information identifying a playing condition fulfilled in the game device 10b is attached to the message. When the user clears a playing condition predefined by the game software, the game device 10a retrieves a message associated with the condition and displays the message on the display device 12. The message provided may be speech. In this case, the game device 10a outputs a speech message from a speaker. This allows a highly responsive message that matches the playing condition of the game to be delivered. Where no distinction is required, the game device 10a and the game device 10b will be referred to as a "game device 10" below. The game device 10 may be a dedicated game device. Alternatively, the game device 10 may be a computer having an emulator installed so as to operate as a game device.

Figure 2:
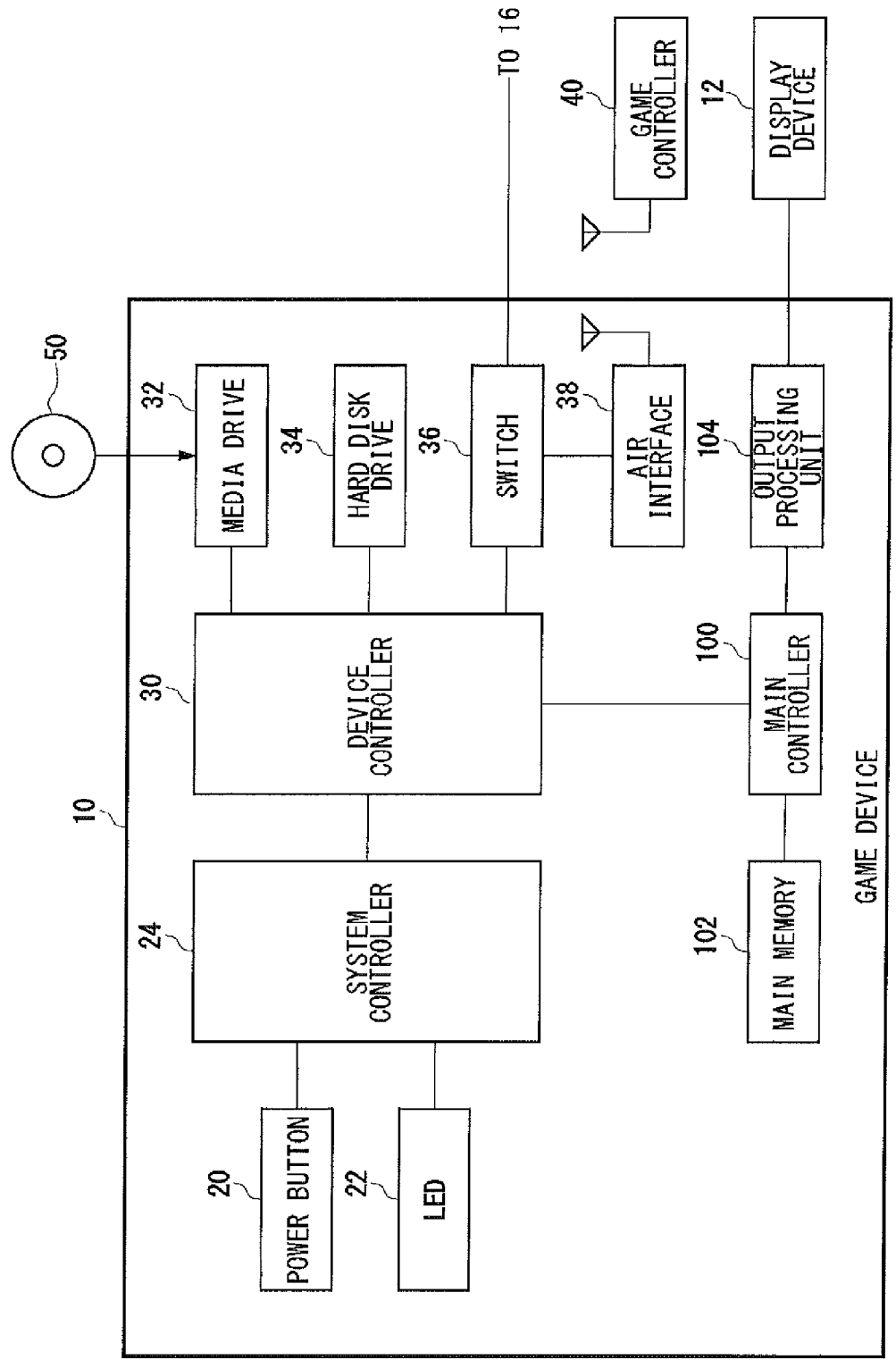
FIG. 2 shows hardware blocks of the game device.

FIG. 2 shows hardware blocks of the game device 10. The game device 10 comprises a power button 20, an LED 22, a system controller 24, a device controller 30, a media drive 32, a hard disk drive 34, a switch 36, an air interface 38, a main controller 100, a main memory 102, and an output processing unit 104.

The power button 20 is an input unit where a user input is provided. The button is operated to turn the game device 10 on or off. The LED 22 indicates whether the power is turned on or off. The system controller 24 detects the pressed state or the non-pressed state of the power button 20. Upon detecting the transition from the power-off state to the pressed state, the system controller 24 activates the main controller 100, starts the boot sequence of the operating system, and turns the LED 22 on. When a power cable is connected to the game device 10, the system controller 24 maintains the standby mode even in the power-off state and monitors whether the power button 20 is pressed.

Like a south bridge, the device controller 30 is configured as a large-scale integrated circuit (LSI) for executing the delivery of information between devices. As illustrated, the system controller 24, the media drive 32, the hard disk drive 34, the switch 36, and the main controller 100 are connected to the device controller 30. The device controller 30 controls the timing of data transfer, canceling differences in electrical property between the devices or differences in data transfer rates thereof. The hard disk drive 34 is drives a built-in hard disk so as to write and read data. The built-in hard disk functions as a storage device for storing data. The media drive 32 is a drive device that drives and detects a read-only recording medium 50 when the recording medium 50 storing game software is mounted, so as to read necessary data from the recording medium 50. The recording medium 50 may be a medium such as an optical disk and a magneto-optical disk.

The switch 36 is an Ethernet (registered trademark) switch and is a device connected wirelessly or by cable to an external device for transmission and reception of data. The switch 36 transmits and receives message data with the message provider server 18 via the network 16. Further, the switch 36 is connected to the air interface 38. The air interface 38 is connected to the game controller 40 provided with the function of communicating wirelessly using a communication protocol such as the Bluetooth protocol (registered trademark) or the IEEE802.11 protocol. User control information entered via the game controller 40 is provided to the main controller 100 via the air interface 38, the switch 36, and the device controller 30.

The main controller 100 is provided with a multicore CPU. One general-purpose processor core and a plurality of simple processor cores are provided in a single CPU. The general-purpose processor core is referred to as a power processing unit (PPU) and the remaining processor cores are referred to as synergistic-processing units (SPU). The main controller 100 provides a function and an environment for using the game device 10 efficiently. The main controller 100 runs an operating system (hereinafter, simply referred to as "OS") for controlling the entirety of the device. The OS layers of the game device 10 according to the embodiment comprises three layers, namely, the user layer, the kernel layer, and the hypervisor layer from top to bottom. Software for the user layer, kernel layer, and hypervisor layer is integrated and functions as the "OS" of the game device 10.

When power is turned on using the power button 20, the system controller 24 supplies power to the main controller 100 and the output processing unit 104 via the device controller 30. When power is supplied to the main controller 100, PPU first runs the boot loader of the OS and starts the hypervisor layer. Subsequently, PPU starts the kernel layer of the OS and then starts the user layer so as to be ready for data supplied from the hard disk drive 34 or the recording medium 50. This allows the main controller 100 to run the game program.

The main controller 100 is provided with a memory controller connected to the main memory 102. The PPU is provided with a register and a main processor as an entity of execution. The PPU efficiently allocates to the SPU's tasks as basic units of processing in applications that are run. The PPU itself may execute a task. The SPU is provided with a register, a subprocessor as an entity of execution, and a local memory as a local storage area. The main memory 102 and the local memory are configured as a random access memory (RAM). The SPU is provided with a dedicated direct memory access (DMA) controller as a control unit. By performing data transfer between the main memory 102 and the local memory, a stream of data can be processed at a high speed, and high-speed data transfer is achieved between a frame memory built in the output processing unit 104 and the local memory.

The output processing unit 104 is connected to the display device 12 and outputs a video signal and an audio signal resulting from executing the application. The output processing unit 104 is provided with a graphics processing unit (GPU) that implements image processing functions. High definition multimedia interface (HDMI) is employed in the GPU so that the GPU is capable of outputting the video signal in the digital format.

One aspect of the game device 10 in the game system 1 is that the device 10 is an information processing device provided with the function of delivering messages. Another is that the game device 10 is an information processing device provided with the function of outputting a delivered message to the user. While the game device 10b of FIG. 1 is described as delivering a message and the game device 10a is described as communicating the message to the user, a given game device 10 has both aspects. The functions of the game device 10 are implemented by game software, system software, and a message management utility.

In this example, the game system 1 is described as an exemplary information communicating system. In other words, the processing functions of the game device 10 can be applied to information processing devices adapted to run applications other than games. The information processing device runs system software, application software, and a message management utility. Hereinafter, the processing functions of the game device 10 as an exemplary information processing device implemented by the system software, game software, and the message management utility will be described below.

The message delivery function of the game device 10 will be explained. When a predefined playing condition of a game is fulfilled as the user is playing, the game software calls the message management utility installed in the game device 10 and communicates condition identification information identifying the fulfilled condition to the message management utility. This part of the process is hard-coded in the game program. The message management utility directs the system software to generate an input area to enter a message. In response to the direction, the system software generates the input area to enter a message in the game screen. When the user enters a message, the system software delivers the entered message to the message management utility. The message management utility generates message data that includes the message and additional information that identifies the playing condition of the game that is fulfilled, and stores the message data in the hard disk drive 34. The message management utility generates transmission data by appending to the message data a header specifying a game device and/or the message provider server 18 as a destination of transmission. The message management utility transmits the generated data to the message provider server 18 according to a timing schedule.

A description will now be given of a summary of the function of the game device 10 for outputting a message. The message management utility downloads message data destined to the host game device from the message provider server 18 according to a timing schedule and stores the data in the hard disk drive 34. When a predefined playing condition of a game is fulfilled as the user is playing, the game software calls the message management utility installed in the game device 10 and communicates condition identification information identifying the fulfilled condition to the message management utility. This part of the process is hard-coded in the game program. When the condition identification information identifying the fulfilled playing condition of the game is acquired, the message management utility reads the message in the message data including the additional information and corresponding to the acquired condition identification information from the hard disk drive 34 and directs the system software to display the message. In response to the direction, the system software generates information for displaying the message in the game screen. By displaying a message created when another user fulfilled the same condition in the game screen, the message is provided in such a manner that the user can feel the presence of the other user and feel as if playing the game concurrently even if the game is being played off-line.

Figure 3:
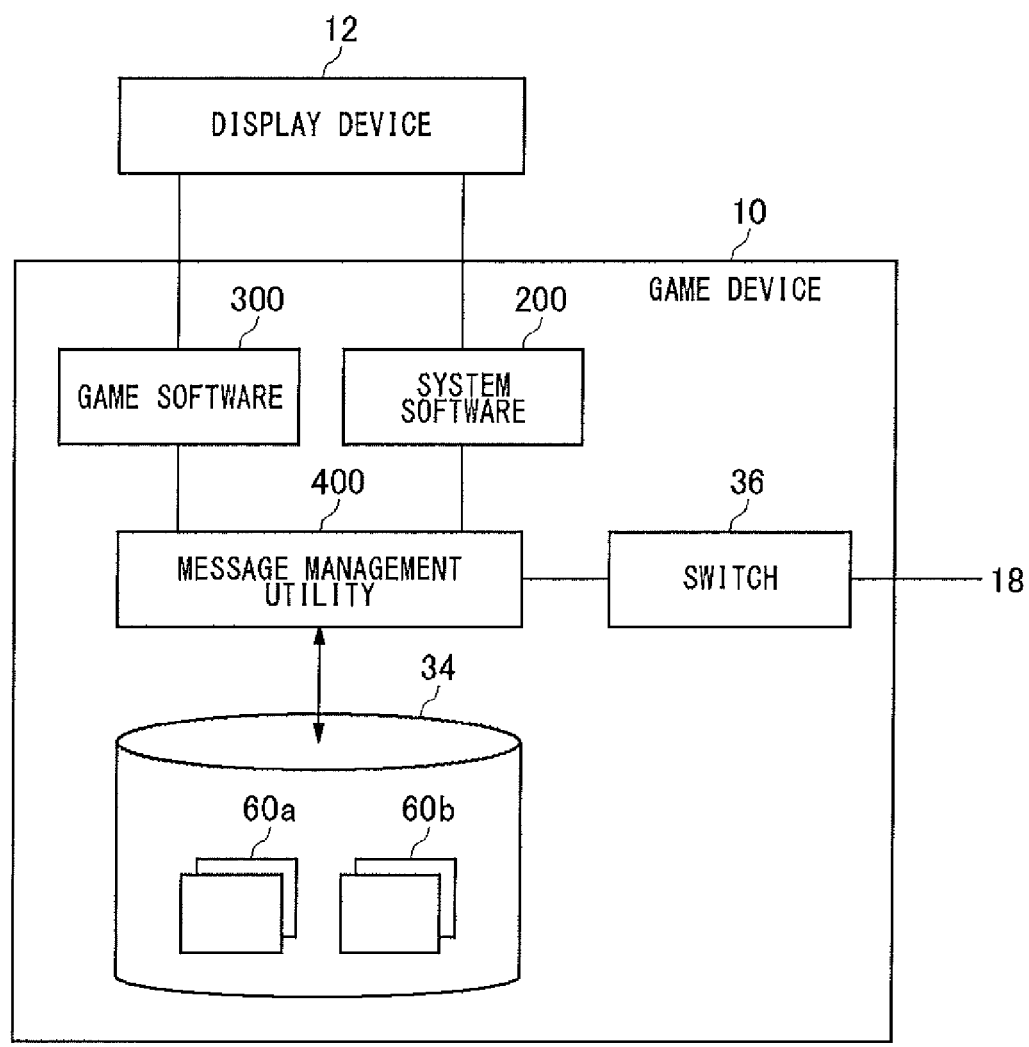
FIG. 3 shows functional blocks of the game system for running the process of managing messages.

FIG. 3 shows functional blocks of the game system 1 for running the process of managing messages. The game device 10 runs system software 200, game software 300, and message management utility software (hereinafter, "message management utility") 400. The system software 200 is an operating system (OS) and has display processing functions using a graphical user interface (GUI). The message management utility 400 has the role of aiding the message delivery function and output function of the game system 1.

<Message Acquisition Function>

When started, the game software 300 calls a "message acquisition function" from the message management utility 400. The message acquisition function forms a part of the message output function. This causes the message management utility 400 to transmit a request to acquire a message to the message provider server 18 via the switch 36. When the message provider server 18 has any message data destined to the transmitting game device 10, the message provider server 18 transmits message data to the game device 10. The message management utility 400 stores received message data 60a in the hard disk drive 34.

<Message Entry Function>

The game software 300 calls the "message entry function" from the message management utility 400 when a playing condition of a game is fulfilled. The message entry function forms a part of the message delivery function. Using the message entry function, the message management utility 400 causes the system software 200 to generate a message input area. The message management utility 400 generates message data 60b containing the message entered in the input area and additional information identifying the fulfilled condition in a predetermined format, and stores the message data in the hard disk drive 34.

<Message Communication Function>

The game software 300 also calls the "message communication function" from the message management utility 400 when a playing condition of a game is fulfilled. The message communication function forms a part of the message output function. Using the message communication function, the message management utility 400 reads the message data 60a generated when the same condition is fulfilled from the hard disk drive 34. The message management utility 400 causes the system software 200 to communicate the message.

The message entry function and the message communication function are called when a game playing condition is fulfilled. The game software 300 may not call the message entry function and the message communication function at the same time. The game software 300 may call the message communication function first and call the message entry function when the message communication process is ended.

<Message Transmission Function>

The game software 300 calls the "message transmission function" from the message management utility 400 when the user stops playing a game. The message transmission function forms a part of the message delivery function. Using the message transmission function, the message management utility 400 generates transmission data comprising the message data 60b generated while the game is being played, plus a header identifying the transmitting game device. The message management utility 400 transmits the transmission data to the message provider server 18. Where no distinction is required, the message data 60a, 60b will be referred to as "message data 60" below.

Figure 4:
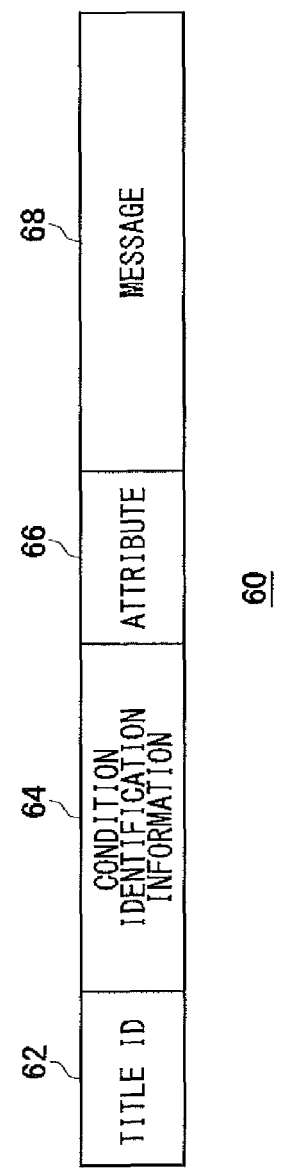
FIG. 4 shows the data format of message data.

FIG. 4 shows the data format of the message data 60. The message data 60 is provided with fields for a title ID 62, condition identification information 64, an attribute 66, and a message 68. The field for the title ID 62 includes identification information for identifying a game title. The field for the condition identification information 64 includes information for identifying a playing condition of a game. For example, where the game software 300 assigns an identification number (ID) to each playing condition and refers to the identification number as an event ID (also referred to as a "condition ID"), the condition identification information 64 may be an event ID of a game event that is accomplished. The condition identification information 64 may describe a playing condition itself. The condition identification information 64 may be additional information whereby the message management utility 400 can identify a playing condition. The field for the attribute 66 includes attribute information of the message 68. The attribute 66 is basically set by the user who delivers the message. Alternatively, the attribute may be set by another user. The attribute 66 will be described in further detail later. The field for the message 68 includes the message entered by the user.

A description will now be given of the details of the game device 10.

Figure 5:
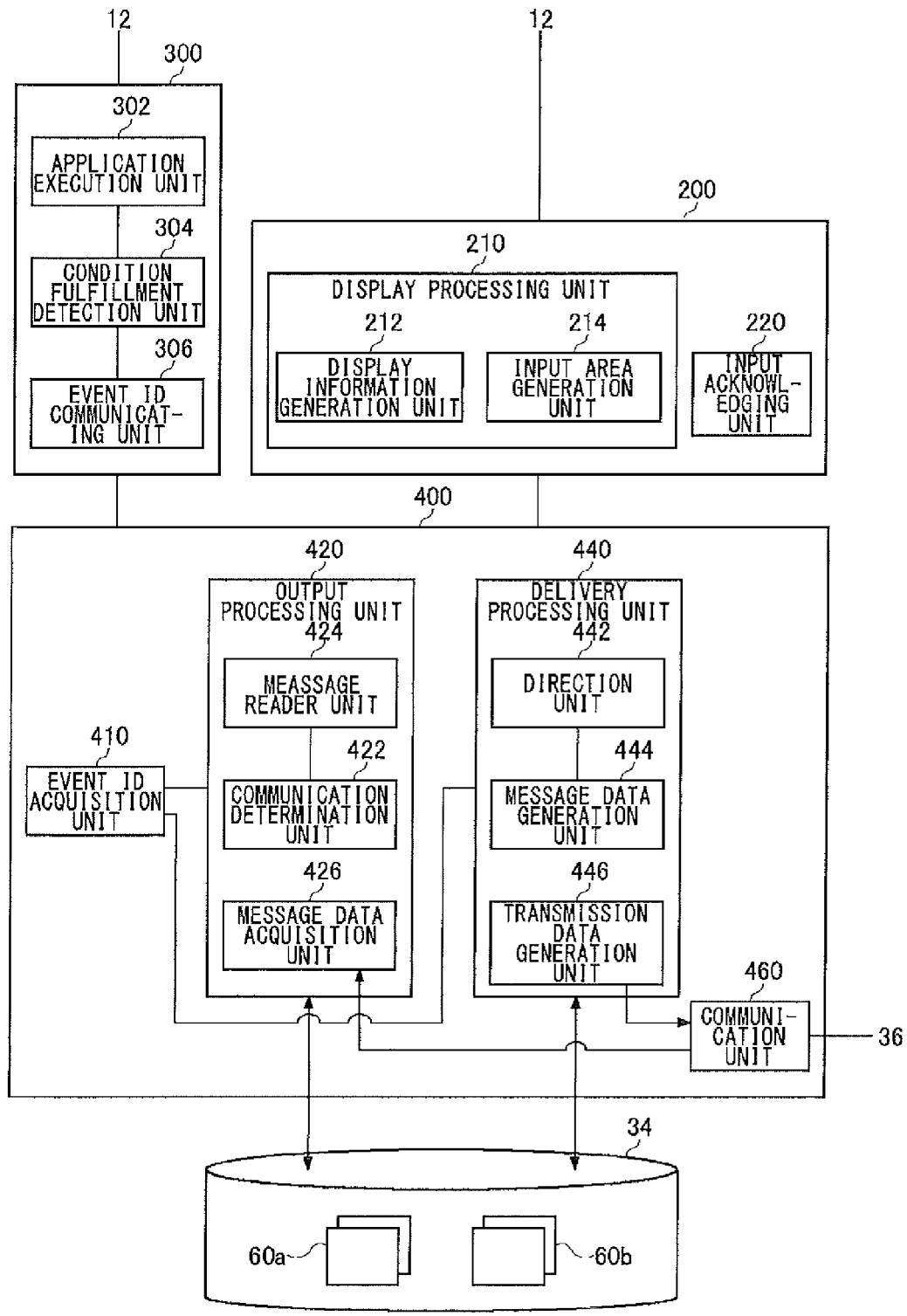
FIG. 5 shows the configuration of the game device in further detail.

FIG. 5 shows the configuration of the game device 10 shown in FIG. 3 in further detail. The functions of the game device 10 are implemented using the system software 200, the game software 300, and the message management utility 400. When the message management utility 400 is called by the game software 300, the message management utility 400 is notified of the title ID of the game.

The system software 200 operates as an operating system (OS) and is provided with a display processing unit 210 and an input acknowledging unit 220. The display processing unit 210 is provided with a display information generation unit 212 and an input area generation unit 214. The game software 300 is provided with an application execution unit 302, a condition fulfillment detection unit 304 and an event ID communicating unit 306.

The message management utility 400 is provided with an event ID acquisition unit 410, an output processing unit 420, a delivery processing unit 440, and a communication unit 460. The output processing unit 420 is provided with a communication determination unit 422, a message reader unit 424, and a message data acquisition unit 426. The delivery processing unit 440 is provided with a direction unit 442, a message data generation unit 444, and a transmission data generation unit 446.

The elements depicted in FIG. 5 as functional blocks for performing various processes are implemented by hardware such as a central processing unit (CPU), memory, or other LSI's, and by software such as a programs etc., loaded into the memory. As described above, the main controller 100 is provided with a single PPU and a plurality of SPU's. The PPU and the SPU's embody the functions either alone or in combination. Therefore, it will be obvious to those skilled in the art that the functional blocks may be implemented in a variety of manners by hardware, software, or a combination of hardware and software.

FIG. 1 shows the game system 1 in which the game device 10b delivers a message and the game device 10a outputs a message. Using the illustrated example, a description will be given below of the game system 1 in which the game device 10a of user A acquires and outputs the message data delivered from the game device 10b of user B.

<Message Delivery Process>

The application execution unit 302 in the game software 300 in the game device 10b receives a control input of user B via the game controller 40 and runs a game program. In the first embodiment, the game software 300 predefines playing conditions of the game and assigns event ID's to respective conditions. The game software 300 is coded to output the event ID when the event occurs. The content of the playing condition assigned the event ID may be made known to users or kept secret. The game software 300 maintains a table that maps event ID's to the content of playing conditions.

FIG. 6 shows an exemplary event table that maps event ID's to playing conditions. Fulfillment of a playing condition gives the user a chance to enter a message or gives a chance to communicate to the user a message from another user. As shown, an event ID may be assigned not only to a positive result of beating a final boss (event ID:01000000) but also to a negative result of being defeated by a final boss (event ID:01000001). The playing condition of "being located in a dungeon" as indicated by "Dungeon in a volcano" (event ID:000010000) may be defined as an event. An event table is created by a game manufacturer and built in the game software 300. An event table also maintains a mapping between title ID's and game titles. The content of a playing condition described in the event table is presented to a screen in which to enter a message described later or presented to the user when a screen for browsing messages is generated.

The condition fulfillment detection unit 304 refers to the condition of game progress and detects that an event occurs, i.e., that a playing condition of the game predefined in the game is fulfilled. The process of detection is hard-coded in the game program. The process of acquiring an event ID when the event occurs is written in the game program. Detection of fulfillment of a condition corresponds to acquiring an event ID. The event ID communicating unit 306 communicates the acquired event ID to the message management utility 400.

Figure 7:
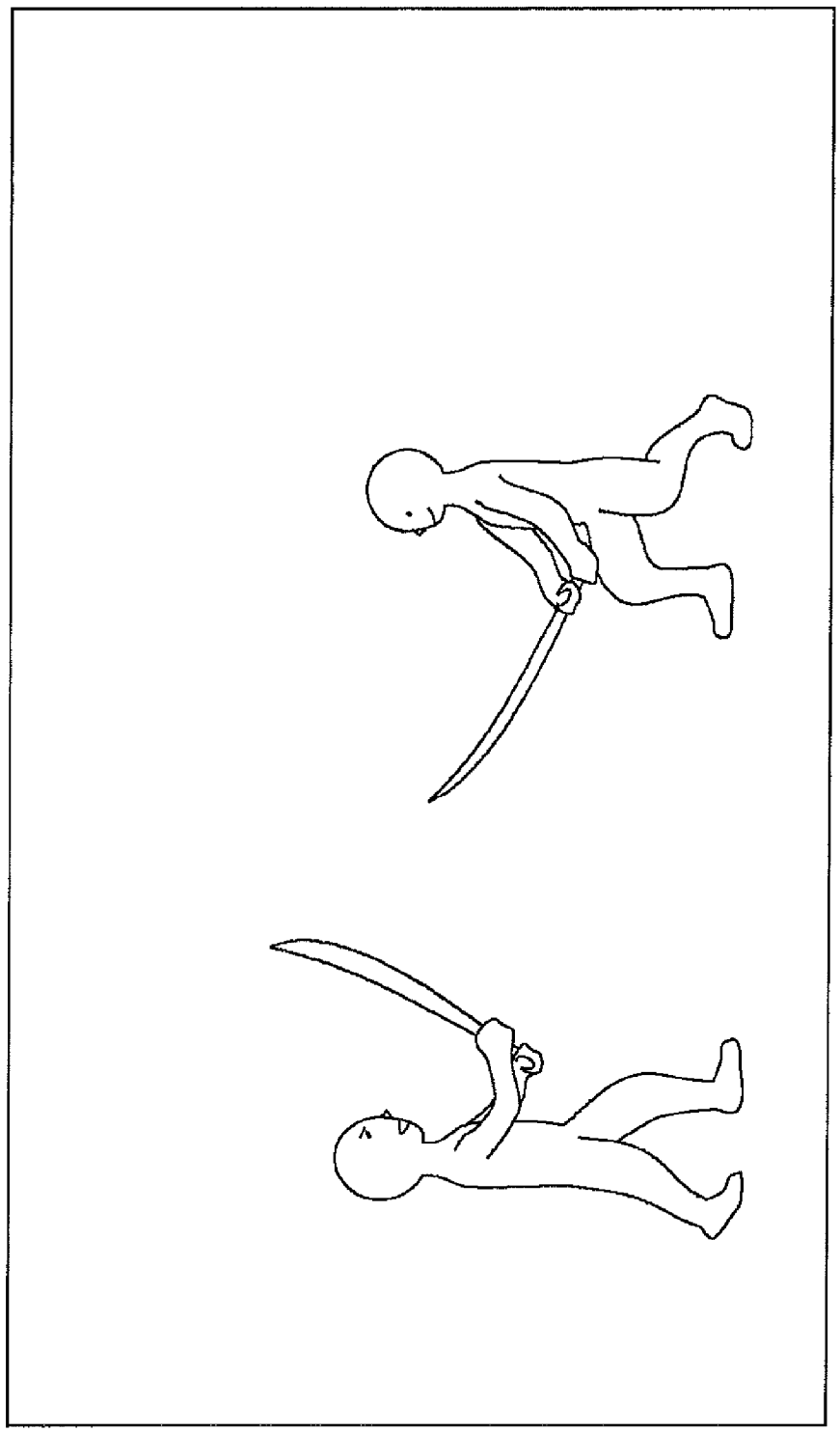
FIG. 7 shows an exemplary game screen.

FIG. 7 shows an exemplary screen processed by the application execution unit 302 and displayed on the display device 12. The game screen shows that a user character controlled by the game controller 40 meets an enemy final boss and is about to start a fight. The condition fulfillment detection unit 304 acquires the event ID mapped to an event "Start a fight with a final boss" shown in FIG. 6 when the user character meets the final boss. The event ID communicating unit 306 communicates the event ID "00111111" identifying the fulfilled playing condition to the message management utility 400.

The event ID acquisition unit 410 in the message management utility 400 acquires the communicated event ID and delivers the ID to the direction unit 442. The direction unit 442 directs the input area generation unit 214 of the system software 200 to generate the input area to enter a message. The input area generation unit 214 generates the input area to enter a message and displays the area superimposed on the game screen. The message input area may be a window for the user to enter a message.

Figure 8:
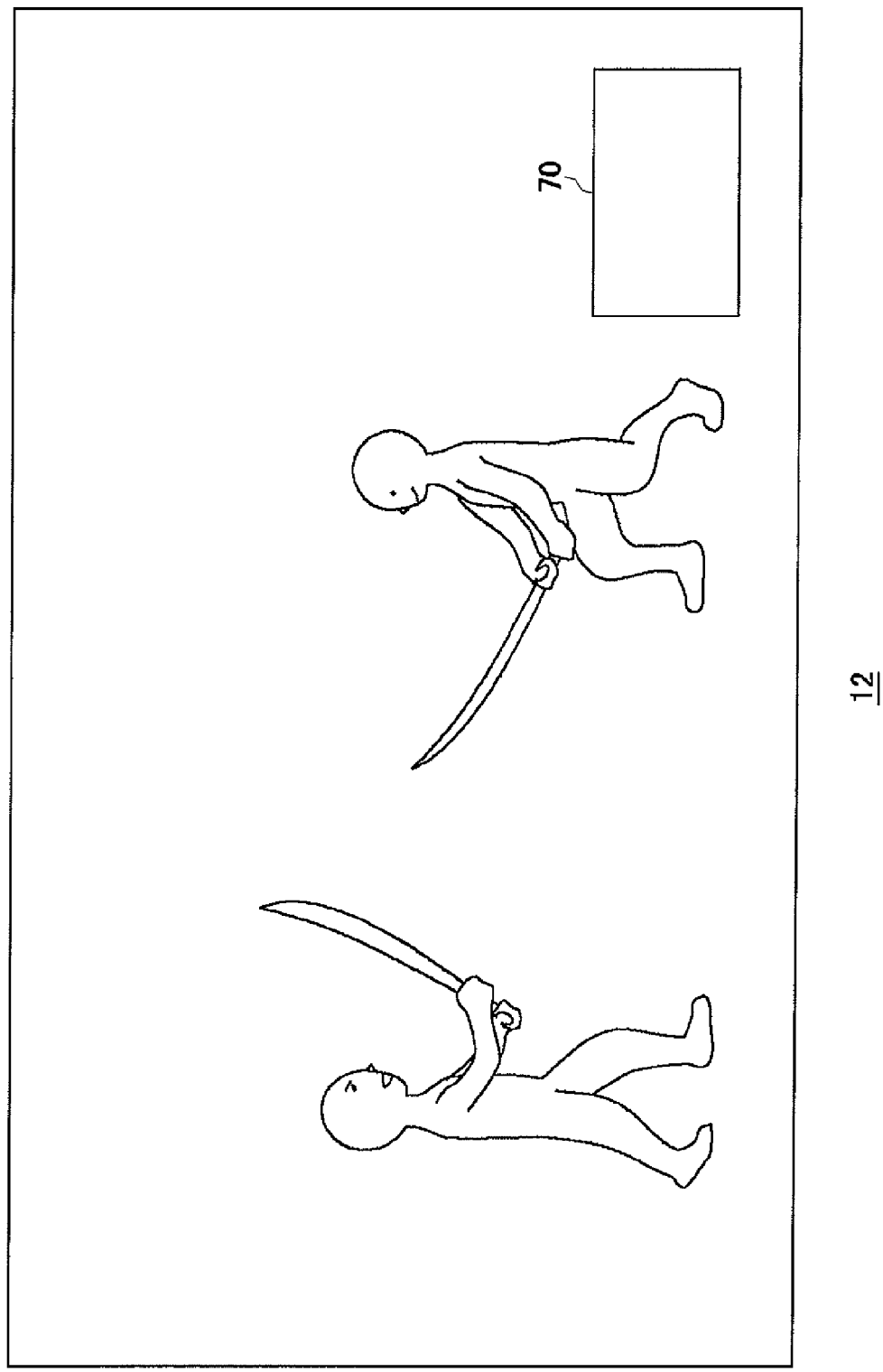
FIG. 8 shows an input area displayed superimposed on the game screen.

FIG. 8 shows an input area 70 displayed superimposed on the game screen. For example, the input area generation unit 214 displays the input area 70 to enter a message near an edge of the game screen so that the game progress is not disturbed. The input area generation unit 214 may display the input area 70 at the lower edge of the game screen.

User B enters a message in the input area 70. The message entered may be "I'll do my best" or may be a message of cheering others up, like "Let's do our best". The user may enter a text at will, using a user interface such as the game controller 40 or a keyboard. A plurality of predetermined fixed messages may be made available and displayed to be selectable from a pull-down menu so that the user can select and enter a message in a simple operation.

While a message is being entered, user B may suspend the progress of the game by pressing a PAUSE button for suspending the game progress. In this case, when the input area generation unit 214 receives a direction from the direction unit 442, the input area generation unit 214 displays information, indicating that a message can be entered, superimposed on the game screen, instead of displaying the input area 70 on the game screen immediately. When user B viewing the information presses the PAUSE button, the application execution unit 302 suspends the progress of the game and then the input area generation unit 214 displays the input area 70 on the screen. In games such as chess of Japanese chess where the progress is relatively slow, the input area generation unit 214 may display the input area 70 superimposed on the game screen of the game being played. In games like fighting where the progress is relatively fast, it is desirable that the input area generation unit 214 display the input area 70 in response to the operation of the PAUSE button. The function for display control is configured by the software 300.

Instead of entering a message immediately when a predetermined playing condition is fulfilled, the user may wish to continue the game play and enter a message for a collection of plurality of playing conditions fulfilled when the user is ready to leave off the game. In this case, the input area generation unit 214 notifies the user that a message can be entered each time a playing condition is fulfilled. If a message is not entered (e.g., if the PAUSE button is not pressed), events for which a message can be entered are collected. The input area generation unit 214 may collect screen shots of the game occurring when playing conditions are fulfilled so that the user can review the events later. The input area generation unit 214 may present the shots to the user attempting to enter a message collectively. Details will be described later.

When the PAUSE button is pressed, the input area generation unit 214 presents a list of events for which a message can be entered so that the user can enter a message. To help the user to provide an entry other than a message, the input area generation unit 214 may present a predetermined input format to the user in the input area 70.

Figure 9A:
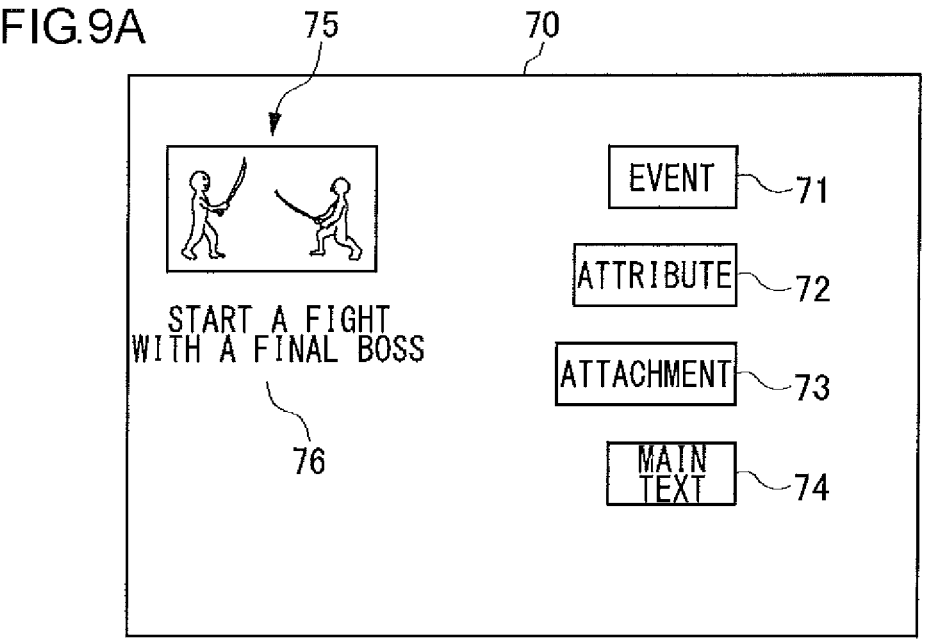
FIG. 9A shows an example of an input format.

FIG. 9A shows an example of an input format generated in the input area 70. The input format includes a tab 71 for identifying an event, a tab 72 for configuring a message attribute, a tab 73 for defining an attached item, and a tab 74 for opening a screen to enter a message text. The tabs are configured to be sequentially selectable from top to bottom. When the tabs are initially displayed, only the tab 71 is made selectable by the user. The user selects a tab by using the game controller 40 and enters necessary information.

Figure 9B:
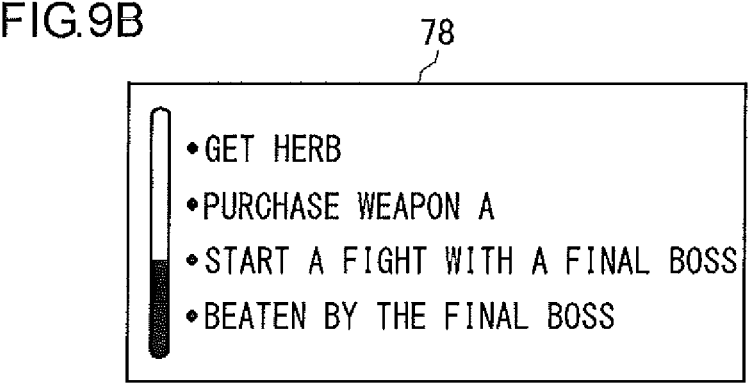
FIG. 9B shows an example of an event determination screen.

When the tab 71 is activated, an event determination screen 78 shown in FIG. 9B is displayed. When the event determination screen 78 is generated, the event ID acquisition unit 410 acquires an event table from the game software 300 and delivers the table to the display processing unit 210. The input area generation unit 214 stores a collection of event ID's of events for which a message can be entered, i.e., events for which event ID's are communicated from the event ID communicating unit 306 but no messages have been entered. The input area generation unit 214 refers to the event table so as to retrieve the "content of playing condition" from the event ID's of those events for which no messages have been entered and display a list of such events on the event determination screen 78. This allows a list of content of playing conditions fulfilled so far for which no messages have been entered to be displayed in the event determination screen 78.

For example, when the user character is beaten by a final boss, the event determination screen 78 displays the playing condition "beaten by the final boss". Unless the user beats the final boss, the playing condition "beat the final boss" is not displayed. The event determination screen 78 is displayed so as not to overlap the input area 70. For example, when an event is selected in the event determination screen 78, a screen shot of the game screen occurring when the event occurred (or is occurring) is displayed in a thumbnail display area 75. The screen shot displayed in the thumbnail area 75 has the role of reminding the user of the past game play. The content of the event (the content of the playing condition shown in FIG. 6) is described in a playing condition 76. When the user determines any of the events displayed in the list, the input format shown in FIG. 9A is displayed again.

Figure 9C:
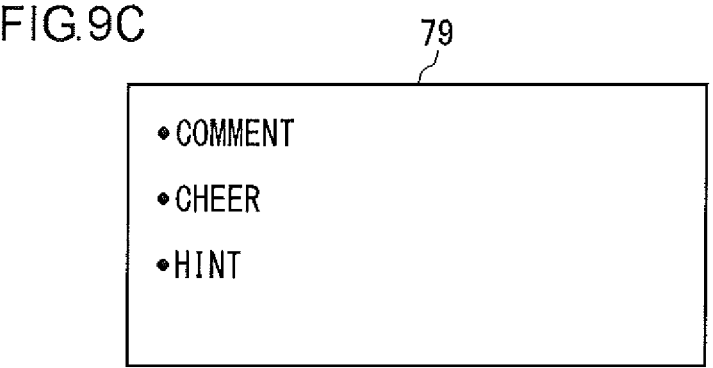
FIG. 9C shows an example of attribute determination screen.

When the user selects an event, the tab 72 is made selectable by the user. When the tab 72 is activated, an attribute determination screen 79 shown in FIG. 9C is displayed. A list of message attributes entered is displayed in the attribute determination screen 79. The "comment" attribute is selected when the user enters a commentary message like "Let's beat the boss character!" or "We'll go beating it" about the event. The "cheer" attribute is selected when the user enters a message like "Hang in there!" as mental support of another user. The "hint" attribute is selected when the user enters a message like "The boss character appears to be vulnerable to fire attack" as an advice to another user. In order for a message assigned the "hint" attribute to be displayed on the game device 10 of another user, the message should be accepted by the other user, as described later.

When the user determines an attribute, the tab 73 is made selectable by the user. When the tab 73 is activated, the user can include an item in the message data delivered to another user. When the user determines an attribute, the tab 74 is also made selectable. If the user does not include an item in the message data, the user activates the tab 74. When the tab 74 is activated, the user enters a message text.

The input acknowledging unit 220 in the system software 200 acknowledges an input message. When a message is entered according to an input format shown in FIG. 9A, the input acknowledging unit 220 acknowledges additional information such as information identifying the event (playing condition), information identifying the attribute, and information identifying the item along with the message. The input acknowledging unit 220 provides the acknowledged message and the additional information to the message data generation unit 444 of the message management utility 400. The message data generation unit 444 uses the message and the additional information generate message data in the data format shown in FIG. 4. When an item is attached, the field for the item is appended to the data format shown in FIG. 4.

The title ID is communicated by the game software 300 to the message management utility 400 when the utility 400 is called. The event ID acquisition unit 410 delivers the communicated title ID to the delivery processing unit 440. The title ID may be communicated to the event ID acquisition unit 410 each time the event ID communicating unit 306 communicates the event ID to the event ID acquisition unit 410 so that the event ID acquisition unit 410 delivers the title ID to the delivery processing unit 440. By acquiring the title ID and by being provided with the message and the additional information, the message data generation unit 444 generates message data of the data format shown in FIG. 4. Of the additional information, the message data generation unit 444 according to the first embodiment includes the event ID (condition identification information) in the message data without exception. The message data generation unit 444 stores the generated message data 60b in the hard disk drive 34.

The hard disk drive 34 stores information identifying the game device 10a that is the destination of delivering the message data 60b. The transmission data generation unit 446 generates transmission data in which the destination information is appended to the message data 60b stored in the hard disk drive 34, according to a predetermined timing schedule. The communication unit 460 transmits the generated data to the message provider server 18.

Figure 10:
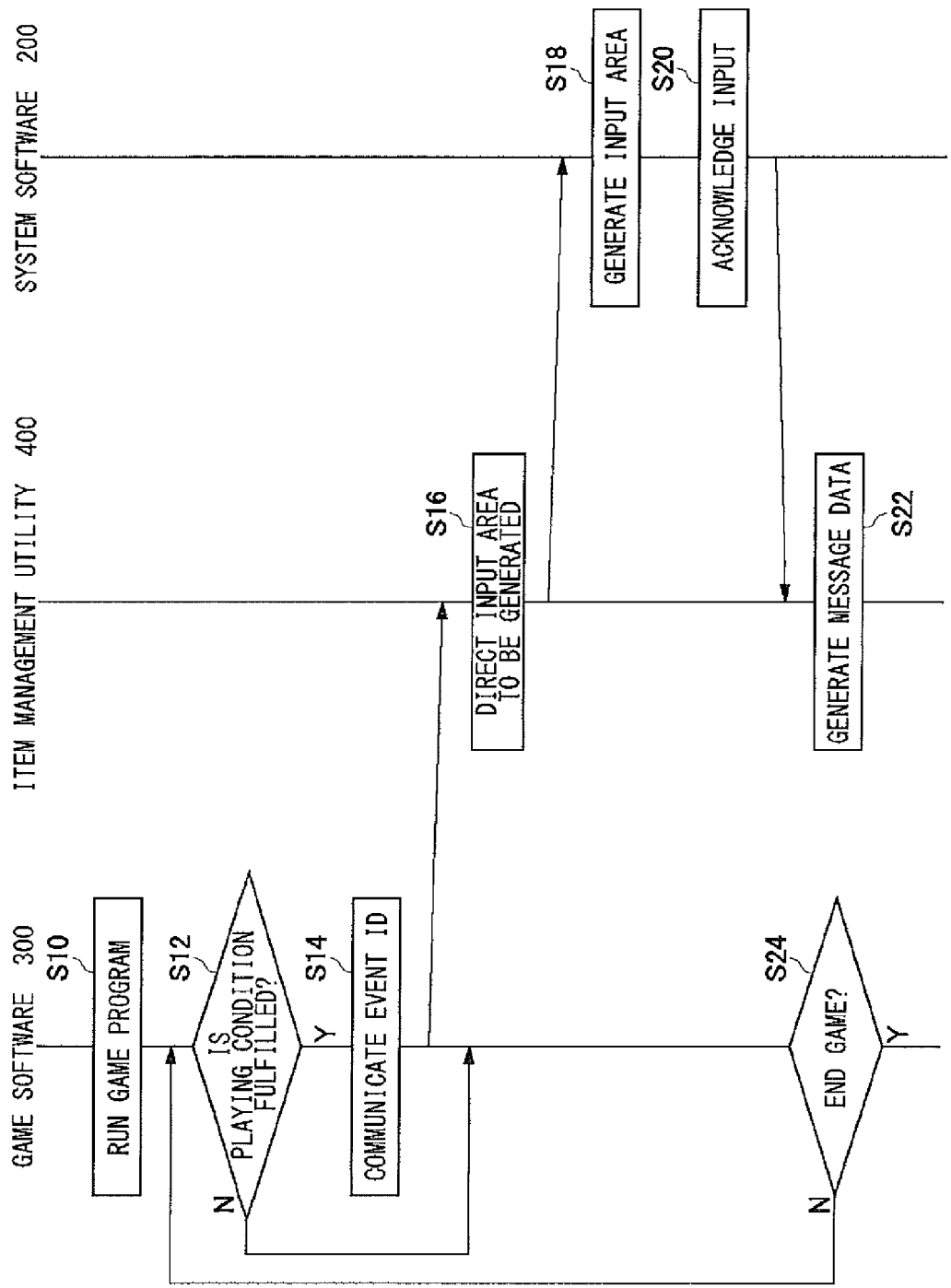
FIG. 10 is a flowchart for the process of generating a message.

FIG. 10 is a flowchart for the process of generating a message. Referring to the flowchart shown in FIG. 10, the steps in the respective components are denoted by a combination of S (initial letter of Step), which indicates "step", and a numeral. When a determination is made in a step denoted by a combination of S and a numeral and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10). The notation in the flowchart is also observed in the flowcharts shown in other figures.

The application execution unit 302 in the game software 300 receives a control input of the user via the game controller 40 and runs a game program (S10). The condition fulfillment detection unit 304 refers to the condition of game progress and detects whether a playing condition of the game predefined in the game is fulfilled (S12). When the condition fulfillment detection unit 304 detects that the playing condition is fulfilled (Y in S12), the condition fulfillment detection unit 304 acquires the event ID hard-coded in association with the condition. Determination that the fulfillment of a playing condition is detected may be made when the event ID is acquired. The event ID communicating unit 306 communicates the acquired event ID to the message management utility 400 (S14). When the playing condition of the game is not fulfilled (N in S12), the event ID is not communicated.

The event ID acquisition unit 410 in the message management utility 400 acquires the communicated event ID and delivers the ID to the direction unit 442. The direction unit 442 directs the input area generation unit 214 to generate the input area 70 (S16). The input area generation unit 214 in the system software 200 generates the input area 70 (S18) and displays the area on the screen of the display device 12. The input acknowledging unit 220 acknowledges a message entered by the user (S20) and delivers the message to the message data generation unit 444. The message data generation unit 444 generates the message data 60b in the format shown in FIG. 4 (S22). The process of generating messages is performed until the game is ended (N in S24). When the game is ended (Y in S24), the process of generating messages is ended. The generated message data is transmitted by the communication unit 460 to the game device 10a via the message provider server 18.

<Message Output Process>

A description will now be given of the process of outputting a message in the game device 10a. When started, the game software 300 of the game device 10a calls a "message acquisition function" from the message management utility 400. The communication unit 460 in the message management utility 400 accesses the message provider server 18 and requests the delivery of message data destined to the host device. When the message provider server 18 maintains the requested message data, the server 18 transmits the data to the communication unit 460. The message data for all game titles maintained in the message provider server 18 are transmitted to the communication unit 460 regardless of the game title run by the game software 300. The message data acquisition unit 426 acquires the message data 60a via the communication unit 460 and stores the data in the hard disk drive 34. This establishes an environment to present the message suitable for the playing condition to user A.

The application execution unit 302 in the game software 300 receives a control input of user A via the game controller 40 and runs the game program. As mentioned before, the process of acquiring an event ID in response to an event is hard-coded in the game program.

The condition fulfillment detection unit 304 refers to the condition of game progress and detects that an event occurs, i.e., a playing condition of the game predefined in the game is fulfilled. The event ID communicating unit 306 communicates the acquired event ID to the message management utility 400.

The event ID acquisition unit 410 in the message management utility 400 acquires the communicated event ID and delivers the ID to the communication determination unit 422. The event ID acquisition unit 410 delivers the title ID to the output processing unit 420 when the message management utility 400 is called by the game software 300. The communication determination unit 422 refers to the message data 60a stored in the hard disk drive 34 and having the same title ID and determines whether the message data 60a having the additional information corresponding to the event ID delivered from the event ID acquisition unit 410 is found. The condition identification information 64 included in the message data 60a is an event ID identifying the playing condition fulfilled in another game device 10b. In this case, the communication determination unit 422 compares the event ID acquired by the event ID acquisition unit 410 with the event ID included in the message data 60a. When they match, the communication determination unit 422 determines that the message data 60a corresponding to the acquired event ID is found. The result of determination is delivered to the message reader unit 424. The message reader unit 424 reads the relevant message data 60a from the hard disk drive 34 and supplies the data to the display information generation unit 212 in the system software 200.

The display information generation unit 212 functions as a unit for communicating a message. More specifically, the display information generation unit 212 generates display information for displaying the message read by the message reader unit 424 superimposed on the game screen. If the message is a speech, the speaker functions as a communicating unit and outputs a speech message.

Figure 11:
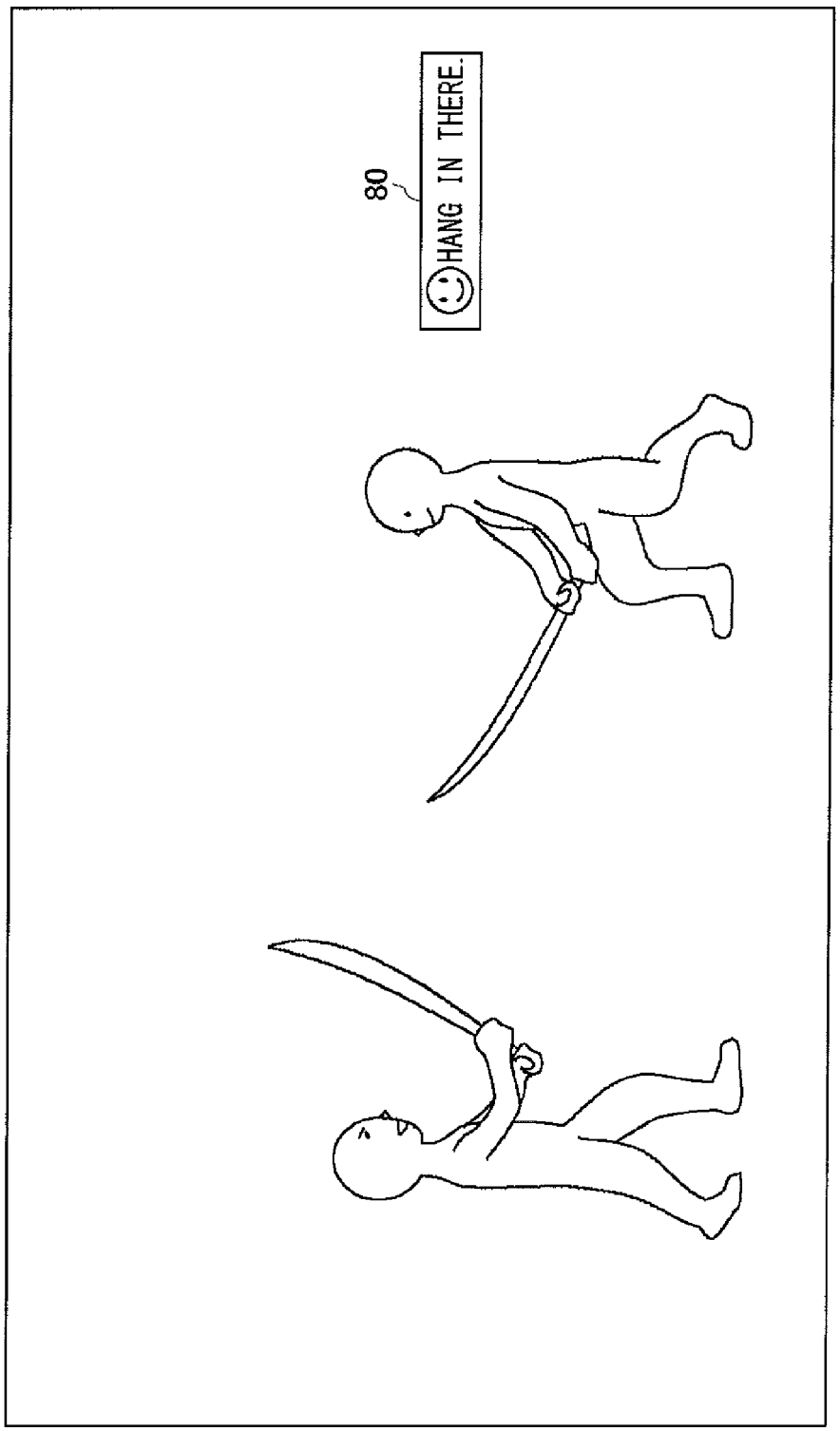
FIG. 11 is a display area displayed superimposed on the game screen.

FIG. 11 is a display area 80 displayed superimposed on the game screen. For example, the display information generation unit 212 displays the display area 80 for a message near an edge of the game screen so that the game progress is not disturbed. When there are a plurality of messages, the messages may be arranged vertically. The display area 80 may include the user name or an icon image of the user generating the message. In order to display the user name or an icon image, the user name or an icon image is included in the message data 60 delivered in advance. By displaying a message generated by another user when the same playing condition is fulfilled, the user can feel as if the user is playing the game together. In this way, a playing environment in which the presence of other users can be felt is realized.

The display information generation unit 212 stops displaying the display area 80 when a predetermined period of time has elapsed since the display of the area is started. The duration of display may be defined by the user. Alternatively, the display may be terminated by the user control using the game controller 40.

When the message is displayed, user A may press the PAUSE button to stop the progress of the game. In this case, instead of displaying the display area 80 in the game screen immediately upon receiving the message read by the message reader unit 424, the display information generation unit 212 temporarily displays information, indicating that the message is available, superimposed on the game screen. When the user seeing the information presses the PAUSE button, the application execution unit 302 suspends the game progress and the display information generation unit 212 displays the display area 80 in the screen. This function for display control is defined by the game software 300.

Figure 12:
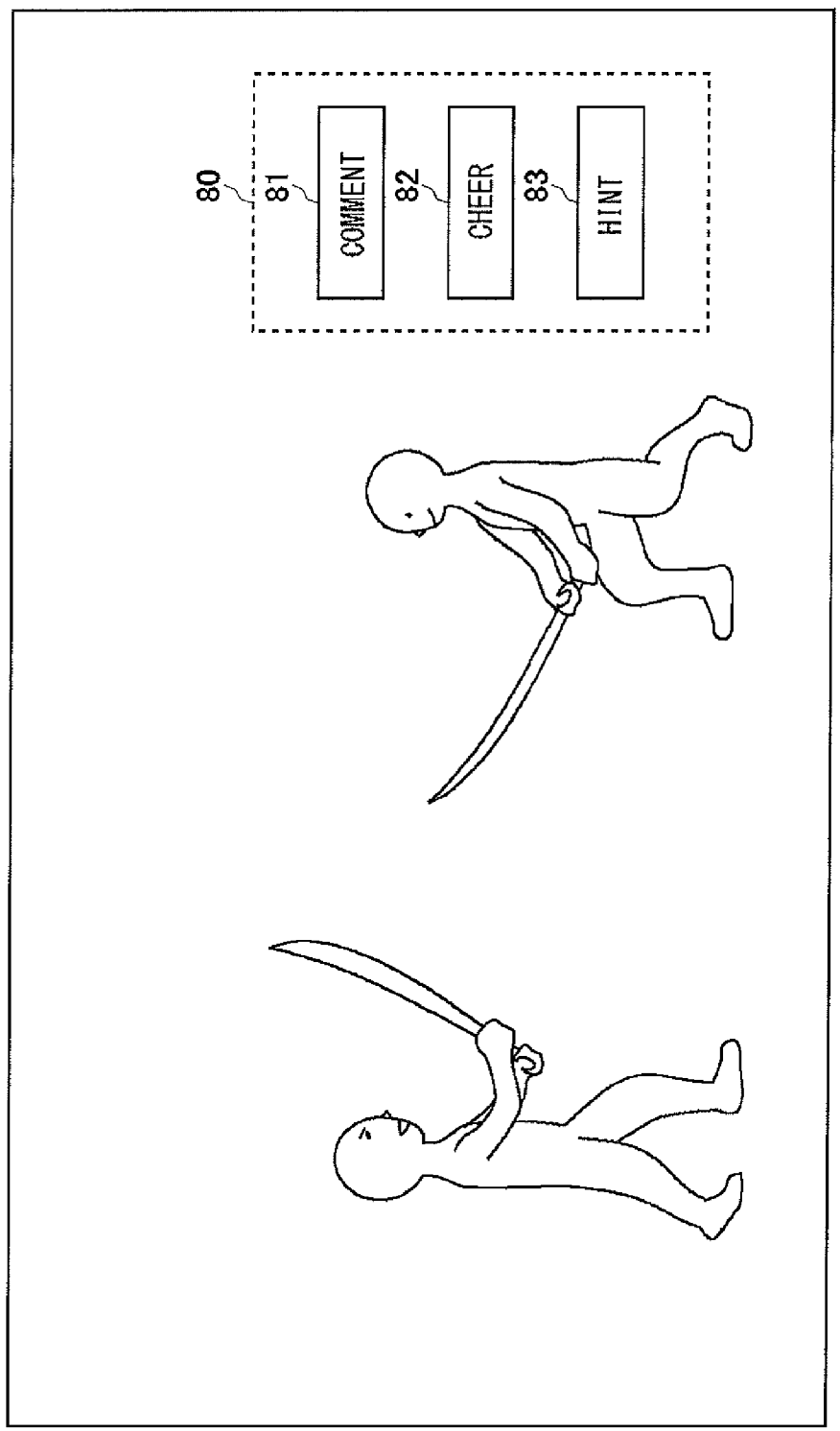
FIG. 12 shows another example of a display area displayed superimposed on the game screen.

FIG. 12 shows another example of the display area 80 displayed superimposed on the game screen. When an attribute is defined in the message data 60a, the display information generation unit 212 may display messages according to their attributes. By selecting tabs 81, 82, and 83 denoting the respective message attributes, the user can view the message with the selected attribute. Messages having the "comment" attribute or the "cheer" attribute may be directly displayed in the display area 80 as shown in FIG. 11 without requiring the selection of the tab 81 or the tab 82. Meanwhile, messages having the "hint" attribute include a clue as to how the game is won and may subtract from the enjoyment for the user playing the game. Therefore, such a message may remain invisible unless the tab 83 is selected. In this way, the display information generation unit 212 may use different modes of displaying messages depending on the attribute defined.

The display information generation unit 212 may provide the user with a screen in which the user can browse the acquired message data 60a. For example, the browsing screen shows game titles, names and icons of users transmitting the message data 60a, and message contents.

Figure 13:
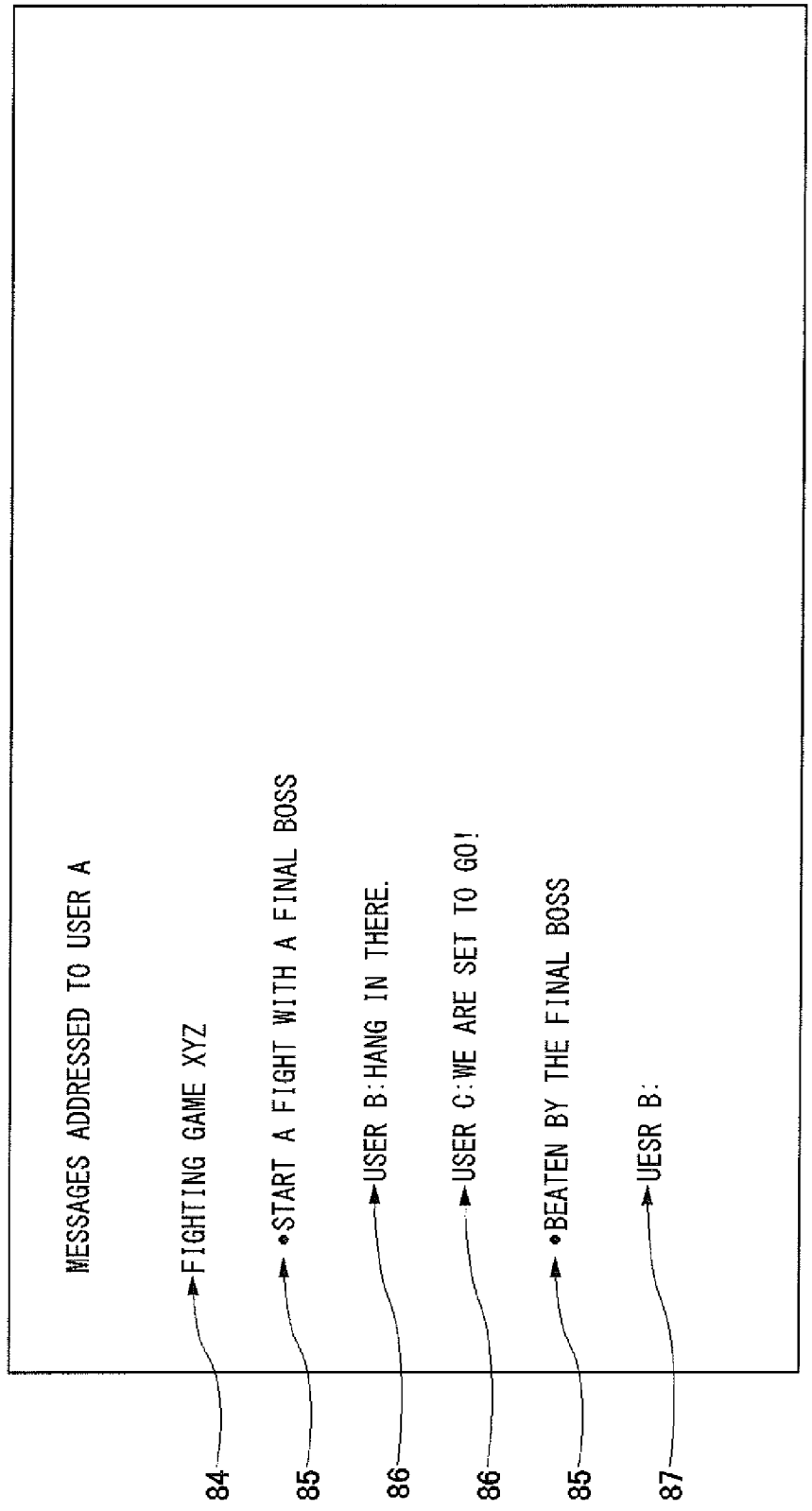
FIG. 13 shows an example of a message browsing screen.

FIG. 13 shows an example of a message browsing screen. When the browsing screen is generated, the event ID acquisition unit 410 acquires an event table from the game software 300. The message reader unit 424 reads the message data 60a stored in the hard disk drive 34 and acquires the event table from the event ID acquisition unit 410. The event table read from the game software 300 may be stored in the hard disk drive 34 in advance. In this case, the message reader unit 424 reads the event table from the hard disk drive 34. The message reader unit 424 supplies the event table and the message data 60a to the display information generation unit 212.

The display information generation unit 212 extracts from the event table the content of playing condition mapped to the condition identification information 64 in the message data 60a. The display information generation unit 212 also extracts the name of the game title from the event table. The display information generation unit 212 uses the game title name 84, the content of playing condition 85, and the message 86 to generate the message browsing screen. This allows user A to browse the arriving messages at the same time.

When user A has not fulfilled a playing condition "beaten by the final boss", the message content is not displayed even if a message corresponding to the playing condition has arrived from user B. For example, only the user name (user B) may be displayed as display information 87. The display information generation unit 212 ensures that only those messages related to playing conditions fulfilled by user A can be browsed. By reading the message, user A can remember the feeling of being there playing the game. Users who have not been able to read messages while playing the game can read messages from the browsing screen. For those messages related to playing conditions not fulfilled yet, only the name of the user delivering the message is displayed so that user A can know that user B has already cleared the playing condition, giving user A an incentive to fulfill the playing condition.

Described above is an example where the game device 10a downloads the message data 60a from another game device 10b. The game device 10a may download the message data 60a prepared by a game manufacturer. The message data 60a may be included in the game software 300. In this case, the message data 60a may be read from the game software 300 into the hard disk drive 34 when, for example, the game software 300 is run for the first time. For example, the game manufacturer prepares the message data 60a that can be used as a manual of the game. By using the output function of the game device 10 and exploiting the system software 200 to let the information be known to the user, it is not necessary to build the game software 300 with the function of displaying a manual. As a result, the software can be developed in fewer steps.

Figure 14:
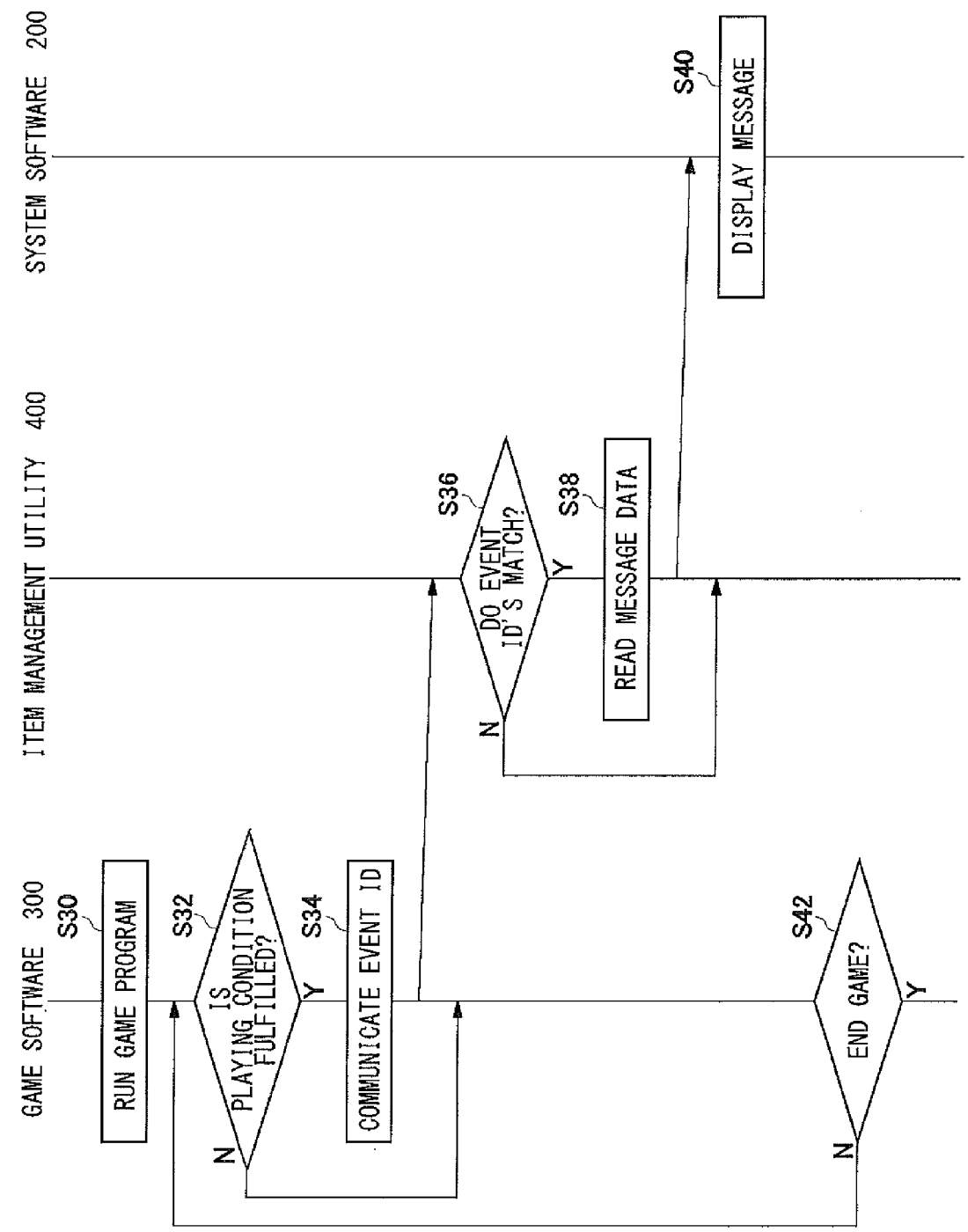
FIG. 14 is a flowchart for the process of outputting a message.

FIG. 14 is a flowchart for the process of outputting a message. The application execution unit 302 in the game software 300 receives a control input of the user via the game controller 40 and runs a game program (S30). The condition fulfillment detection unit 304 refers to the condition of game progress and detects whether a playing condition of the game predefined in the game is fulfilled (S32). When the condition fulfillment detection unit 304 detects that the playing condition is fulfilled (Y in S32), the condition fulfillment detection unit 304 acquires the event ID hard-coded in association with the condition. Determination that the fulfillment of a playing condition is detected may be made when the event ID is acquired. The event ID communicating unit 306 communicates the acquired event ID to the message management utility 400 (S34). When the playing condition of the game is not fulfilled (N in S32), the event ID is not communicated.

The event ID acquisition unit 410 in the message management utility 400 acquires the communicated event ID and delivers the ID to the communication determination unit 422. The communication determination unit 422 searches the hard disk drive 34 to find the stored message data 60a with an event ID that matches the delivered event ID (S36). Where the message data 60a with the matching event ID is found (Y in S36), the message reader unit 424 reads the message data 60a having the event ID from the hard disk drive 34 and provides the data to the display information generation unit 212 (S38). When the message data 60a having the matching event ID is not found (N in S36), the message data 60a is not read. The display information generation unit 212 displays the message in the display area 80 (S40). The process of outputting message is continued until the game is ended (N in S42). When the game is ended (Y in S42), the message outputting process is terminated.

Second Embodiment

A summary of the information communicating system according to the second embodiment will be given. The configuration and functions of the game device 10 described as an example of the information processing device in the first embodiment may equally be included in the information processing device according to the second embodiment. Similarly, the configuration and functions of the information processing device described in the second embodiment may equally be included in the game device 10 according to the first embodiment.

The information processing device of the user (user A) according to the second embodiment maintains message data delivered from another user (user B). The message data includes a message and a condition to communicate the message. When, for example, the environment in which the information processing device of user A is located meets (fulfills) the condition to communicate the message, the message is communicated to the user.

At least one of time, place, and occasion is defined in the message data as a communication condition. A condition specified in time will be referred to as "time condition", a condition specified a location will be referred to as "location condition", and a condition specifying an occasion will be referred to as "event condition". These conditions may be used alone or in combination to define a condition to communicate the message. Typical scenes where each condition is used will be described below.

<Communication According to a Time Condition>

User B transmits message data requiring that the time is 0:00 on January 1 as a communication condition to the information processing device of user A before the defined time arrives. For example, user B may transmit a message "Happy New Year". When the current time is 0:00 on January 1, the information processing device of user A determines that the communication condition is met and communicates (makes known) the message to user A. The message may be communicated in any of various methods. For example, the message may be displayed on a display of the information processing device. Alternatively, a speech message may be output from a speaker.

<Communication According to a Location Condition>

User B transmits message data requiring entry into restaurant C as a communication condition to the information processing device of user A. For example, user B may transmit a message "This restaurant is good". The information processing device of user A refers to the positional information from the global positioning system (GPS) and determines that the communication condition is met if the current position is in the restaurant C and communicates the message to user A accordingly.

<Communication According to an Event Condition>

User B transmits message data requiring that a distance of 10 km be walked per day as a communication condition to the information processing device of user A. For example, user B may transmit a message "I have walked 10 km today". The information processing device of user A determines the distance traveled that day by referring to the positional information from the GPS. When 10 km has been traveled, the information processing device determines that the communication condition is met and communicates the message to user A.

For example, the information processing device may derive the distance walked in such a manner that the distance traveled using an automobile is excluded by deriving a distance traveled at a predetermined speed or lower.

<Communication According to a Combination of Conditions>

User transmits message data requiring that a user runs a distance of 21 km in a marathon as a communication condition to the information processing device of user A. For example, user B may transmit a message "You have only half the race to go. Hang in there". If the marathon starts at 10:00 on October 10, the fact that the user runs a distance of 21 km in a marathon started at 10:00 on October 10 is defined as a communication condition, by defining a time condition "10:00 on October 10 or later" and an event condition "distance of 21 km is traveled". The information processing device of user A refers to the positional information of the GPS to determine the distance traveled since 10:00. If the user has traveled 21 km, the information processing device determines that the communication condition is met and communicates the message to user A.

Figure 15:
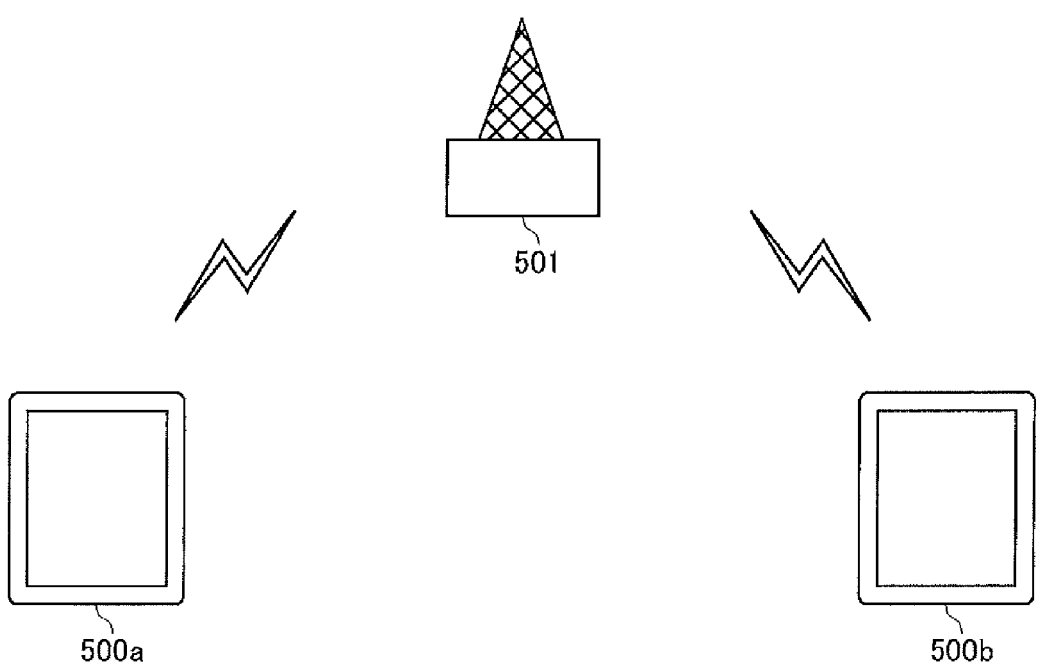
FIG. 15 shows an information communicating system according to the second embodiment of the present invention.

FIG. 15 shows an information communicating system 2 according to the second embodiment of the present invention. The information communicating system 2 is provided with an information processing device 500a held by user A, an information processing device 500b held by user B, and a delivery station 501 for distributing message data. In the illustration, the information processing device 500b is illustrated as a terminal to transmit message data, and the information processing device 500a is illustrated as a terminal to receive message data. FIG. 15 shows the information communicating system 2 in which message data is transmitted and received wirelessly. Alternatively, message data may be transmitted and received by cable. The information processing device 500a may acquire message data from a memory device of removable type such as a USB memory. In this case, the information processing device 500a may not be provided with communication functions. Where no distinction is required, the information processing device 500a and the information processing device 500b will be referred to as an "information processing device 500" below. The information processing device 500 having the function of transmitting and receiving message data will be described.

Figure 16:
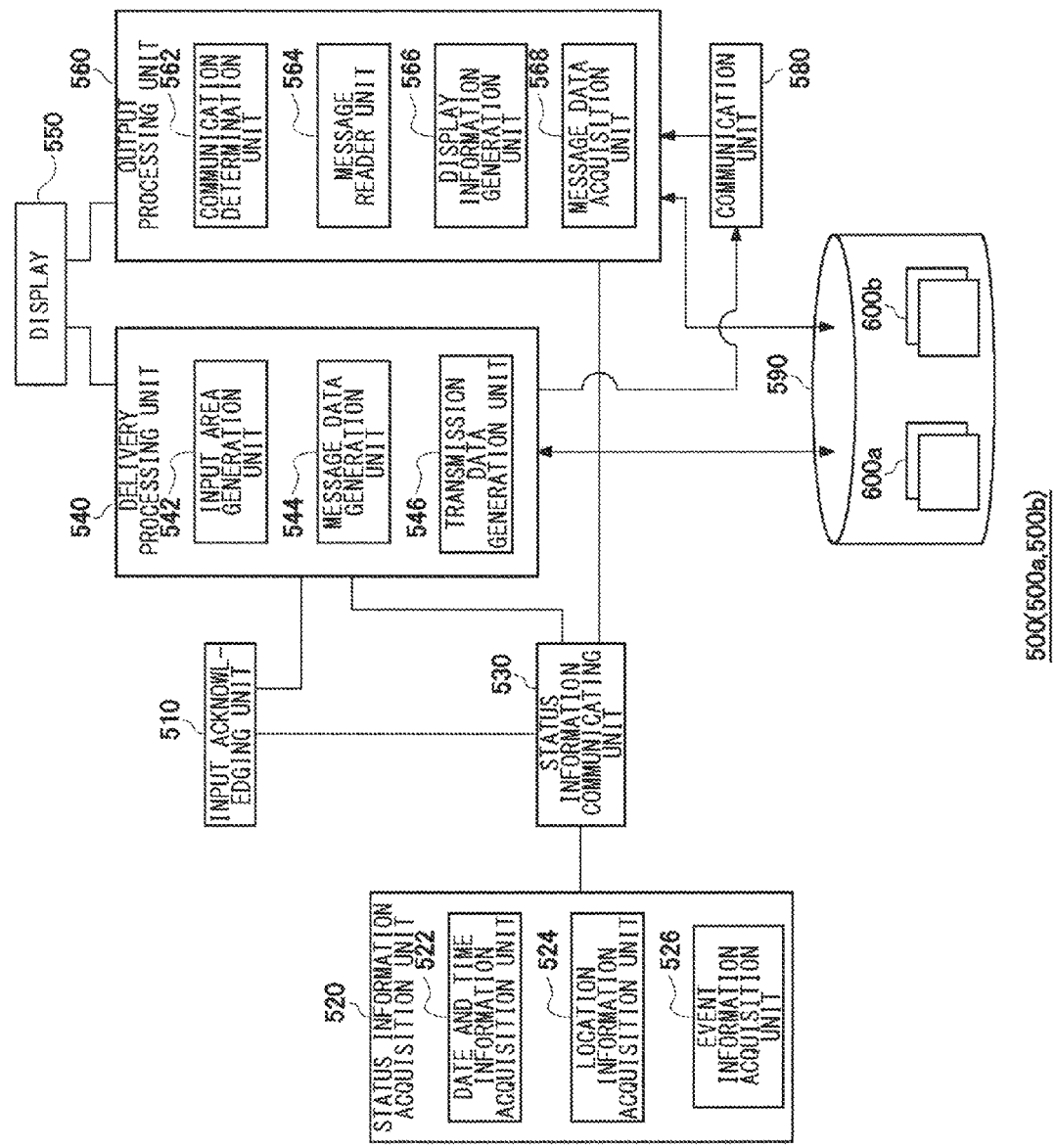
FIG. 16 shows the configuration of the information processing device.

FIG. 16 shows the configuration of the information processing device 500 in the information communicating system. The functions of the information processing device 500 are implemented by system software and a message management utility. The information processing device 500 may be a mobile terminal such as a cell phone or may be a desktop terminal. The information processing device 500 of mobile type will find more use as a reception terminal in the information communicating system 2.

The information processing device 500 is provided with an input acknowledging unit 510, a status information acquisition unit 520, a status information communicating unit 530, a delivery processing unit 540, a display 550, an output processing unit 560, a communication unit 580, and a storage device 590. The status information acquisition unit 520 is provided with a date and time information acquisition unit 522, a location information acquisition unit 524, and an event information acquisition unit 526. The delivery processing unit 540 is provided with an input area generation unit 542, a message data generation unit 544, and a transmission data generation unit 546. The output processing unit 560 is provided with a communication determination unit 562, a message reader unit 564, a display information generation unit 566, and a message data acquisition unit 568.

The elements depicted in FIG. 16. as functional blocks for performing various processes are implemented by hardware such as a central processing unit (CPU), memory, or other LSI's, and by software such as a programs etc., loaded into the memory. Therefore, it will be obvious to those skilled in the art that the functional blocks may be implemented in a variety of manners by a hardware, a software, or a combination of hardware and software.

The storage device 590 stores message data 600a and/or message data 600b. Hereinafter, the message data 600b is described as being data to be delivered and the message data 600a as data to be communicated to the user. Where no distinction is required, the message data 600a, 600b will be referred to as "message data 600" below. The message data 600 includes a condition ID identifying the type of a communication condition, and condition identification information identifying the communication condition.

Figures 17, 18:
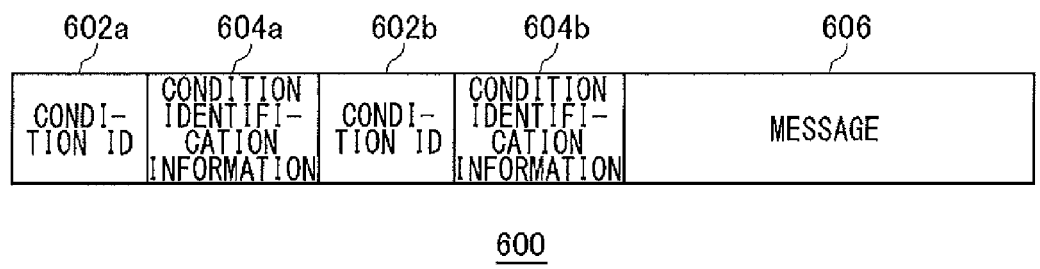
FIG. 17 shows a mapping table that maps conditions ID's to condition types.
FIG. 18 shows a data format of the message data.

FIG. 17 shows a mapping table that maps condition ID's to condition types. In the second embodiment, a time condition, a location condition, and an event condition are available as condition types. Condition ID's are assigned to the respective condition types.

FIG. 18 shows a data format of the message data 600. The message data 600 is provided with fields for condition ID's 602a, 602b (hereinafter, also referred to as "condition ID 602"), condition identification information 604a, 604b (hereinafter, also referred to as "condition identification information 604"), and a message 606. The field for the condition ID 602 includes identification information for identifying a condition type. The field for the condition identification information 604 includes information for identifying a communication condition. For example, where communication conditions are prepared in the information communicating system 2, an identification number (ID) may be assigned to each communication condition so that the communication condition ID is used as condition identification information 604.

In the illustrated example, two communication conditions are included. A condition ID 602a and a condition ID 602b may be ID's identifying different types of conditions (e.g., a time condition and an event condition). Alternatively, both ID's may identify the same condition type. As many combinations of the condition ID 602 and the condition identification information 604 as the number of communication conditions are included in the message data 600.

The field for the message 606 includes a message entered by the user. Information such as the attribute 66 shown in FIG. 4 may be included in the message data 600.

FIG. 15 shows the information communicating system 2 in which the information processing device 500b delivers a message and the information processing device 500a outputs a message. Using the illustrated example, a description will be given below of the information communicating system 2 in which the information processing device 500a acquires and outputs the message data delivered from the information processing device 500b.

<Message Delivery Process>

The input acknowledging unit 510 of the information processing device 500b acknowledges a control input by user B via an interface device. When the input acknowledging unit 510 acknowledges a request to enter a message, the unit directs the delivery processing unit 540 to process an input of a message. The input area generation unit 542 in the delivery processing unit 540 generates the input area to enter a message and displays the area on the display 550.

Figure 19A:
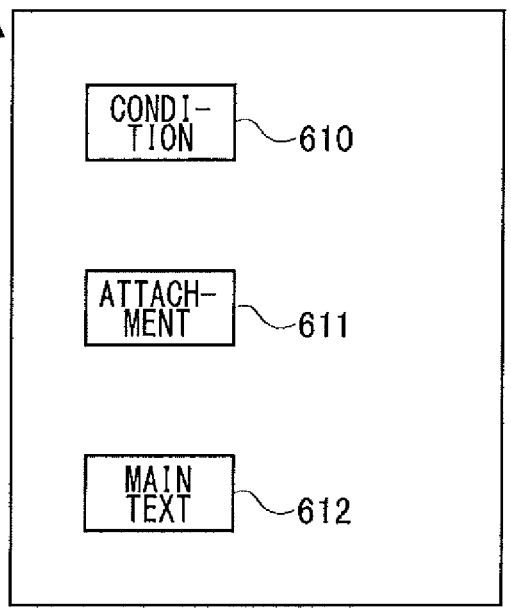
FIG. 19A shows an example of an input format.

FIG. 19A shows an example of an input format displayed on the display 550. The input format includes a tab 610 for specifying a communication condition, a tab 611 for defining an attached file, and a tab 612 for opening a screen to enter the main text of the message. User B selects a tab by using the input interface device and enters necessary information.

Figure 19B:
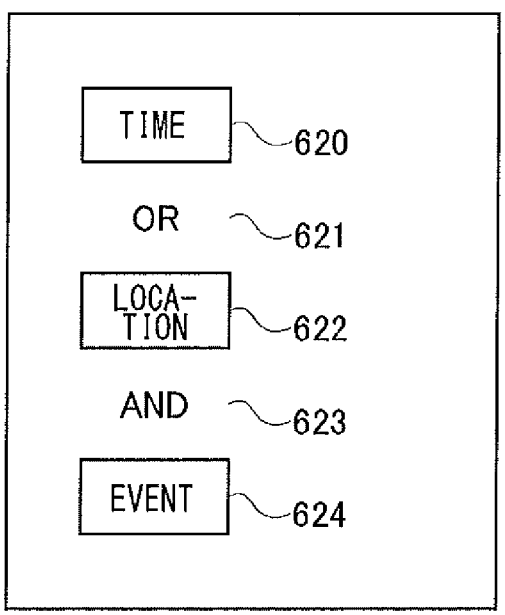
FIG. 19b shows an example of a condition configuration screen.

When the tab 610 is activated, a condition configuration screen shown in FIG. 19B is displayed on the display 550. The condition configuration screen displays information for defining a communication condition. A time tab 620, an AND/OR selection area 621, a location tab 622, an AND/OR selection area 623, and an event tab 624 are provided in the condition configuration screen.

When the time tab 620 is activated, the time condition configuration screen shown in FIG. 20A is displayed on the display 550. Options for configuring a time condition is displayed on the time condition configuration screen. Numerals and days of the week are entered by the user in locations denoted by *.

"MM/DD:HH/MM" is selected to define the date and time of communication. "MM/DD:HH/MM-mm/dd:hh/mm" is selected to specify a period for communication. "Every x-th day of the week" is selected to specify a day of the week. "Every day" is selected to ensure that the message is communicated every day. "HH/MM" is selected to specify the time to communicate the message when "Every x-th day of the week" or "Every day" is selected.

When the location tab 622 is activated, the location configuration screen shown in FIG. 20B is displayed on the display 550. Options for defining a location condition specified by the latitude and longitude are shown in the location configuration screen. In addition to "current location", "registered location A", and "registered location B", an input area for entering an address is displayed. When "current location" is selected, the location information acquisition unit 524 in the information processing device 500 acquires the current location information specified by the latitude and longitude from the GPS. When an address is entered, an inquiry may be sent to a map server so as to acquire the latitude and longitude information of the address, for example.

When the event tab 624 is activated, an input area for configuring an event condition is displayed on the display 550. For example, a software keyboard may be presented on the display 550 so that the user enters an event condition in the input area using the software keyboard. The information processing device 500a at the receiving end is provided with the function of deciphering the event condition, which converts the event condition as entered into information that can be processed in the information processing device 500a. A typical event condition may be prepared in the information communicating system 2 and presented to the user as a template (condition list). In this case, an ID used in the information communicating system 2 may be defined for each condition in the condition list so that conditions are identified by the ID's.

The AND/OR selection areas 621, 623 are areas to configure a logic operator indicating the relation between conditions. If a condition is not defined, the logic operator located above that condition may be disregarded. For example, if a location condition is not defined, the logic operator specified in the AND/OR selection area 621 does not affect the definition of the communication condition. If a time condition and an event condition are defined and AND is defined in the AND/OR selection area 623, the logical product of the time condition and the event condition is defined as the communication condition regardless of the setting in the AND/OR selection area 621.

Referring back to FIG. 19A, when the tab 611 is activated, a screen to select a content to be attached to the message is displayed. User B may select a content such as a photo or music desired to be sent to user A.

When the tab 612 is activated, a screen to enter a message is displayed. User B enters a message as desired by using, for example, a user interface device or a software keyboard. Activation of the tab 612 may enable the user to enter a speech message.

Referring back to FIG. 16, the input acknowledging unit 510 acknowledges the message entered by the user and additional information such as a communication condition. The unit 510 delivers the message and the additional information to the message data generation unit 544. The message data generation unit 544 uses the message and the additional information to generate the message data in the data format shown in FIG. 18. When a content is attached, the field for the content is added to the data format shown in FIG. 18. When attribute information of the message is included, the field for the attribute information is added. The message data generation unit 544 stores the generated message data 600b in the storage device 590.

The storage device 590 stores information identifying the information processing device 500a to which the message data 600b is destined. According to a predetermined timing schedule, the transmission data generation unit 546 generates transmission data in which the destination information is added to the message data 600b stored in the storage device 590. The communication unit 580 transmits the generated transmission data to the delivery station 501. The delivery station 501 transmits the data to the information processing device 500a.

Figure 21:
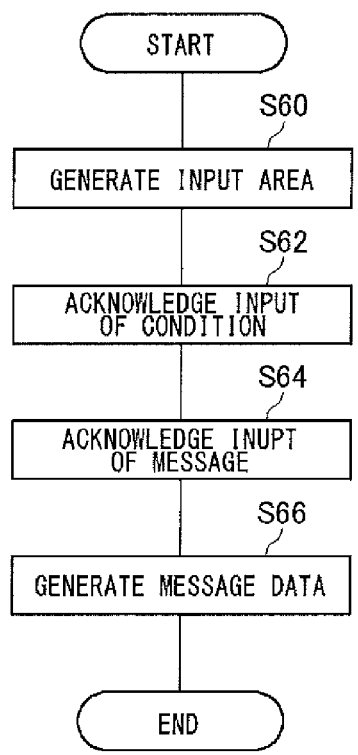
FIG. 21 is a flowchart showing the process of generating a message.

FIG. 21 is a flowchart showing the process of generating a message. When the input acknowledging unit 510 acknowledges a request to enter a message, the input area generation unit 542 displays an area to input a message and displays the area on the display 550 (S60). When the input acknowledging unit 510 acknowledges the communication condition entered (S62) and the message entered (S64), the unit 510 delivers the condition and the message to the message data generation unit 544. The message data generation unit 544 generates the message data 600b in the format shown in FIG. 18 (S66). The generated message data 600b is transmitted to the information processing device 500a of user A.

<Message Output Process>

The communication unit 580 in the information processing device 500a accesses the delivery station 501 and requests the delivery of message data destined to the host device. If the message data is stored in the delivery station 501, the station 501 transmits the data to the communication unit 580. The delivery station 501 may transfer the received message data destined to the information processing device 500a immediately to the information processing device 500a. The message data acquisition unit 568 acquires the message data 600a via the communication unit 580 and stores the data in the storage device 590. This establishes an environment to present the message suitable for the status of the information processing device 500a to user.

The status information acquisition unit 520 acquires the status information of the information processing device 500a. The status information includes the current local and ambient environmental information of the information processing device 500a and also includes the status information and operation information of the information processing device 500a.

The date and time information acquisition unit 522 refers to, for example, a clock function and acquires the current date and time information, i.e., current year-month-day information and time information. The location information acquisition unit 524 acquires current location information using, for example, the GPS. The event information acquisition unit 526 acquires information on an event occurring in the information processing device 500a. The event information acquisition unit 526 acquires the status defined as an event in the information communicating system 2. For example, the fact that the information processing device 500a is moving or the fact that the battery is low may be acquired as an event. Hereinafter, the date and time information, the location information, and the event information will collectively referred to as status information. The date and time information acquisition unit 522, the location information acquisition unit 524, and the event information acquisition unit 526 deliver the acquired information to the status information communicating unit 530.

The functions of the date and time information acquisition unit 522, the location information acquisition unit 524, and the event information acquisition unit 526 may be implemented by the application software. For example, the date and time information acquisition unit 522 may be an application conditioned to deliver the date and time information to the status information communicating unit 530 when it is currently on the hour or 30 minutes past the hour. The location information acquisition unit 524 may be an application conditioned to deliver the location information to the status information communicating unit 530 when it is determined that the device moves to another city by referring to the GPS information. The event information acquisition unit 526 may be an application conditioned to deliver the event information to the status information communicating unit 530 when it is determined that an event occurs (e.g., when it is determined that the battery power is below a predetermined level). The date and time information acquisition unit 522, the location information acquisition unit 524, and the event information acquisition unit 526 may be an application configured to deliver the acquired information to the status information communicating unit 530 periodically.

When the information is delivered from the status information acquisition unit 520, the status information communicating unit 530 communicates the information to the communication determination unit 562. In other words, the status information communicating unit 530 communicates the status information to the communication determination unit 562 when the condition defined in the status information acquisition unit 520 is fulfilled. The status information communicating unit 530 acquires information from the date and time information acquisition unit 522, the location information acquisition unit 524, and the event information acquisition unit 526 at different points of time. Therefore, the status information communicating unit 530 may collect the information and communicate it to the communication determination unit 562 according to a predetermined timing schedule (e.g., periodically).

The communication determination unit 562 determines whether the acquired status information meets the communication condition identified by the condition identification information of the message data 600a stored in the storage device 590. For example, given that the message data 600a requiring a communication condition "the time is 0:00 on January 1" is stored in the storage device 590, the communication determination unit 562 determines that the communication condition is fulfilled if the date and time information delivered from the status information communicating unit 530 indicates "0:00 on January 1". In this process, it is preferable that the communication determination unit 562 refer to the condition ID 602 included in the message data 600a, identify the type of communication condition defined in the message data 600a, and compare the identified type with that of the acquired status information. For example, only the time condition is defined as a communication condition in the above example. The communication determination unit 562 need not compare conditions other than the time condition. By using the condition ID 602 efficiently, time required for determination is reduced.

If the message data 600a requiring entry into restaurant C at "latitude X, longitude Y" as a communication condition is stored in the storage device 590, the communication determination unit 562 determines that the communication condition is fulfilled when the location information delivered from the status information communicating unit 530 indicates "latitude X, longitude Y". If the message data 600a requiring that a distance of 10 km be walked as a communication condition is stored in the storage device 590, the communication determination unit 562 determines that the communication condition is fulfilled when the event information delivered from the status information communicating unit 530 indicates that the traveled distance exceeds 10 km.

When the communication determination unit 562 determines that the communication condition of the message data 600a is fulfilled, the message reader unit 564 reads the message data 600a for which the condition is fulfilled from the storage device 590 and supplies the data to the display information generation unit 566. The display information generation unit 566 functions as a communicating unit for communicating messages. More specifically, the display information generation unit 566 generates display information for displaying the message read by the message reader unit 564 on the display 550.

Figure 22:
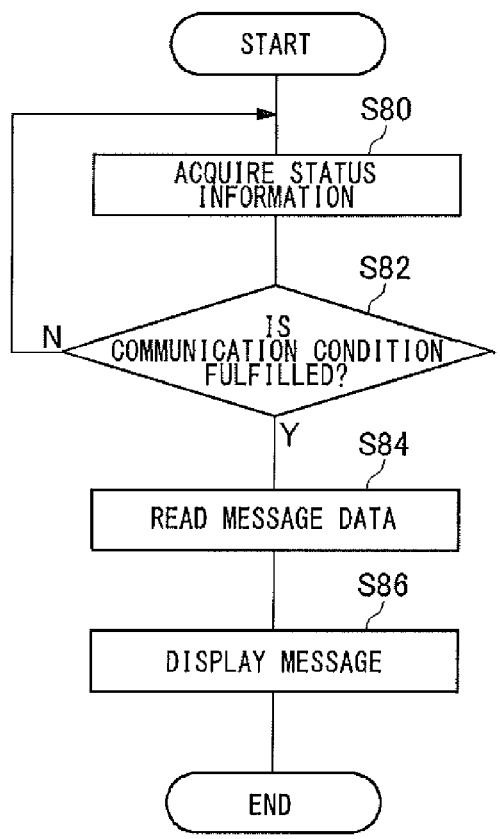
FIG. 22 is a flowchart for the process of outputting a message.

FIG. 22 is a flowchart for the process of outputting a message. The communication determination unit 562 acquires the status information from the status information communicating unit 530 (S80). The communication determination unit 562 determines whether the acquired status information meets the communication condition of the message data 600a stored in the storage device 590 (S82). If the status information meets the communication condition identified by the condition identification information (Y in S82), the message reader unit 564 reads the corresponding message data 600a from the storage device 590 and supplies the data to the display information generation unit 566 (S84). If the status information does not meet the communication condition (N in S82), the message data 600a is not read. The display information generation unit 566 displays the message on the display 550 (S86). If the message is a speech, a speech message is delivered from a speech output unit (not shown).

A description will now be given of attribute information according to the second embodiment. Attribute information is included in the message data 600 and identifies the attribute of the message 606. The attribute information configures the state of the message data 600 that is once read, indicating that the message data is opened, is unopened, or should be deleted. The attribute information is configured by user B delivering the message.

If the attribute information indicates that the message data should be deleted, the message reader unit 564 deletes the read message data 600a from the storage device 590. This avoids a situation where the same message data 600a is displayed when the communication condition is met.

If the attribute information indicates that the message data is opened, the message reader unit 564 sets an "opened" flag for the read message data 600a. The message data 600a for which the "opened" flag is set is not read by the message reader unit 564 next time the communication condition is met and is not communicated to the user.

Meanwhile, if the attribute information indicates the message data as being unopened, the message reader unit 564 does not set an "opened" flag even if the message data 600a has been read. The message data 600a for which an "opened" flag is not set is read by the message reader unit 564 next time the communication condition is met and communicated to the user.

If the information processing device 500 provides the function of browsing messages as described in the first embodiment, messages for which an "opened" flag is set may be displayed for browsing and messages for which the flag is not set may not be subject browsing.

The message data generation unit 544 may define attribute information according to the communication condition of the message. If a time condition such as "Every x-th day of the week" or "Every day" is configured in the time condition configuration screen of FIG. 20A, it is assumed that the message is communicated a plurality of times. Therefore, it is not preferable to delete the message data 600a or to designate the message data as being opened. Accordingly, the message data generation unit 544 automatically sets attribute information indicating "unopened" after the message data is read. Meanwhile, if a time condition "MM/DD:HH/MM" or "MM/DD:HH/MM-mm/dd:hh/mm" is configured, the message need only be displayed once. Therefore, the message data generation unit 544 automatically sets attribute information indicating "opened" or "should be deleted" after the message data is read. For example, if a time condition "MM/DD:HH/MM" or "MM/DD:HH/MM-mm/dd:hh/mm" is configured, attribute information may not be acknowledged from the user and the message data generation unit 544 may mandatorily sets attribute information indicating "opened" or "should be deleted".

Described above is an explanation based on an exemplary embodiment. The embodiment is intended to be illustrative only and it will be obvious to those skilled in the art that various modifications to constituting elements and processes could be developed and that such modifications are also within the scope of the present invention. The first and second embodiments are described, but more effective message notification control can be achieved by combining the embodiments.

DESCRIPTION OF THE REFERENCE NUMERALS

1 . . . game system, 2 . . . information communicating system, 10 . . . game device, 12 . . . display device, 18 . . . message provider server, 34 . . . hard disk drive, 40 . . . game controller, 60 . . . message data, 70 . . . input area, 80 . . . display area, 200 . . . system software, 210 display processing unit, 212 . . . display information generation unit, 214 . . . input area generation unit, 220 . . . input acknowledging unit, 300 . . . game software, 302 . . . application execution unit, 304 . . . condition fulfillment detection unit, 306 . . . event ID communicating unit, 400 . . . message management utility, 410 . . . event ID acquisition unit, 420 . . . output processing unit, 422 . . . communication determination unit, 424 . . . message reader unit, 426 . . . message data acquisition unit, 440 . . . delivery processing unit, 442 . . . direction unit, 444 . . . message data generation unit, 446 . . . transmission data generation unit, 460 . . . communication unit, 500 . . . information processing device, 501 . . . delivery station, 510 . . . input acknowledging unit, 520 . . . status information acquisition unit, 522 . . . date and time information acquisition unit, 524 . . . location information acquisition unit, 526 . . . event information acquisition unit, 530 . . . status information communicating unit, 540 . . . delivery processing unit, 542 . . . input area generation unit, 544 . . . message data generation unit, 546 . . . transmission data generation unit, 550 . . . display, 560 . . . output processing unit, 562 . . . communication determination unit, 564 . . . message reader unit, 566 . . . display information generation unit, 568 . . . message data acquisition unit, 580 . . . communication unit, 590 . . . storage device, 600 . . . message data The present invention is applicable to the technical field of communicating messages to users.

The invention claimed is:

1. An information processing device comprising a microprocessor operating under the control of a computer program, the device comprising:
    an input area generation unit configured to generate, upon a game playing condition predefined in an application being fulfilled, a message input area;
    an acknowledging unit configured to acknowledge a message entered by a user in the input area; and
    a transmission data generation unit configured to generate transmission data including an acknowledged message and additional information identifying the fulfilled condition of the application fulfilled by the user.

2. The information processing device according to claim 1, wherein the input area generation unit presents to the user an attribute determination screen to specify an attribute of the entered message.

3. The information processing device according to claim 1, further comprising:
    an application execution unit configured to execute an application program; and
    a condition fulfillment detection unit configured to detect that a condition predefined in the application is fulfilled,
    wherein the input area generation unit generates an input area to enter a message on a screen when the condition fulfillment detection unit detects that the condition is fulfilled.

4. A computer program embedded in a non-transitory computer readable recording medium, comprising:
    a module configured to generate, upon a game playing condition predefined in an application being fulfilled, a message input area;
    a module configured to acknowledge a message entered by a user in the input area; and
    a module configured to generate transmission data including an acknowledged message and additional information identifying the fulfilled condition of the application fulfilled by the user.

* * * * *